US009535927B2

(12) United States Patent
Bursey

(10) Patent No.: US 9,535,927 B2
(45) Date of Patent: Jan. 3, 2017

(54) METHOD AND APPARATUS FOR SITUATIONAL CONTEXT FOR BIG DATA

(71) Applicant: GREAT-CIRCLE TECHNOLOGIES, INC., Chantilly, VA (US)

(72) Inventor: Brent Bursey, Chantilly, VA (US)

(73) Assignee: Great-Circle Technologies, Inc., Chantilly, VA (US)

(*) Notice: Subject to any disclaimer, the term of this patent is extended or adjusted under 35 U.S.C. 154(b) by 239 days.

(21) Appl. No.: 14/310,165

(22) Filed: Jun. 20, 2014

(65) Prior Publication Data

US 2015/0019531 A1  Jan. 15, 2015

Related U.S. Application Data

(60) Provisional application No. 61/838,441, filed on Jun. 24, 2013.

(51) Int. Cl.
*G06F 7/00* (2006.01)
*G06F 17/30* (2006.01)

(52) U.S. Cl.
CPC .............................. *G06F 17/30241* (2013.01)

(58) Field of Classification Search
CPC ............... G06F 17/30241; G06F 17/30554; G06F 17/30; G06F 17/30572; G06F 17/30601
See application file for complete search history.

(56) References Cited

U.S. PATENT DOCUMENTS

| 5,848,373 A * | 12/1998 | DeLorme | G01C 21/20 340/990 |
| 2010/0124735 A1* | 5/2010 | Chen | G06F 3/0484 434/284 |
| 2011/0229040 A1* | 9/2011 | Thakkar | G06T 7/00 382/190 |
| 2014/0274154 A1* | 9/2014 | Rana | G06Q 30/0282 455/456.3 |

* cited by examiner

*Primary Examiner* — Azam Cheema
(74) *Attorney, Agent, or Firm* — Miles & Stockbridge P.C.; Ajay A. Jagtiani

(57) ABSTRACT

Described is a method and apparatus for constructing a boundary comprising a set of contextual square quadrangles. Also described is a method and apparatus for searching a set of contextual square quadrangles.

36 Claims, 20 Drawing Sheets

Table 1
| | |
|---|---|
|  | (interval-before ?e1 ?e2) |
| 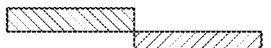 | (interval-meets ?e1 ?e2) |
|  | (interval-overlaps ?e1 ?e2) |
|  | (interval-starts ?e1 ?e2) |
|  | (interval-during ?e1 ?e2) |
|  | (interval-finishes ?e1 ?e2) |
|  | (interval-after ?e1 ?e2) |
| 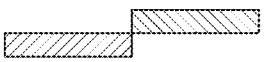 | (interval-met-by ?e1 ?e2) |
| 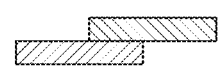 | (interval-overlapped-by ?e1 ?e2) |
| 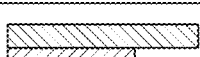 | (interval-started-by ?e1 ?e2) |
| 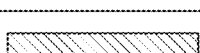 | (interval-contains ?e1 ?e2) |
| 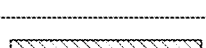 | (interval-finished-by ?e1 ?e2) |
| 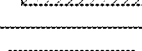 | (interval-cotemporal ?e1 ?e2) |
FIG. 1

Table 2

Contextual Geohash Code IDs at 10 m precision for (0° N, 0° E)

| Level | Lat | Lon | Meridial Distance (Distance) | Meridial Distance (ArcMins) | Meridial Distance (meters) | Contextual Geohash Code ID |
|---|---|---|---|---|---|---|
| 0 | 0.0000 | 0.0000 | 180.0000 | 10,800.0000 | 20001600.0000 | 1 |
| 1 | 0.0000 | 0.0000 | 90.0000 | 5,400.0000 | 10000800.0000 | 1A |
| 2 | 0.0000 | 0.0000 | 45.0000 | 2,700.0000 | 5000400.0000 | 1AC |
| 3 | 0.0000 | 0.0000 | 22.5000 | 1,350.0000 | 2500200.0000 | 1ACC |
| 4 | 0.0000 | 0.0000 | 11.2500 | 675.0000 | 1250100.0000 | 1ACCC |
| 5 | 0.0000 | 0.0000 | 5.6250 | 337.5000 | 625050.0000 | 1ACCCC |
| 6 | 0.0000 | 0.0000 | 2.8125 | 168.7500 | 312525.0000 | 1ACCCCC |
| 7 | 0.0000 | 0.0000 | 1.4063 | 84.3750 | 153232.5000 | 1ACCCCCC |
| 8 | 0.0000 | 0.0000 | 0.7031 | 42.1875 | 78131.2500 | 1ACCCCCCC |
| 9 | 0.0000 | 0.0000 | 0.3516 | 21.0938 | 39065.6250 | 1ACCCCCCCC |
| 10 | 0.0000 | 0.0000 | 0.1758 | 10.5469 | 19532.8125 | 1ACCCCCCCCC |
| 11 | 0.0000 | 0.0000 | 0.0879 | 5.2734 | 9766.4063 | 1ACCCCCCCCCC |
| 12 | 0.0000 | 0.0000 | 0.0439 | 2.6367 | 4883.2031 | 1ACCCCCCCCCCC |
| 13 | 0.0000 | 0.0000 | 0.0220 | 1.3184 | 2441.6016 | 1ACCCCCCCCCCCC |
| 14 | 0.0000 | 0.0000 | 0.0110 | 0.6592 | 1220.8008 | 1ACCCCCCCCCCCCC |
| 15 | 0.0000 | 0.0000 | 0.0055 | 0.3296 | 610.4004 | 1ACCCCCCCCCCCCCC |
| 16 | 0.0000 | 0.0000 | 0.0027 | 0.1648 | 305.2002 | 1ACCCCCCCCCCCCCCC |
| 17 | 0.0000 | 0.0000 | 0.0014 | 0.0824 | 152.6001 | 1ACCCCCCCCCCCCCCCC |
| 18 | 0.0000 | 0.0000 | 0.0007 | 0.0412 | 76.3000 | 1ACCCCCCCCCCCCCCCCC |
| 19 | 0.0000 | 0.0000 | 0.0003 | 0.0206 | 38.1500 | 1ACCCCCCCCCCCCCCCCCC |
| 20 | 0.0000 | 0.0000 | 0.0002 | 0.0103 | 19.0750 | 1ACCCCCCCCCCCCCCCCCCC |
| 21 | 0.0000 | 0.0000 | 0.0001 | 0.0051 | 9.5375 | 1ACCCCCCCCCCCCCCCCCCCC |

FIG. 4

|  | Low address |  |  |  |  |  | High address |  |
|---|---|---|---|---|---|---|---|---|
| Address | 0 | 1 | 2 | 3 | 4 | 5 | 6 | 7 |
| Little-endian | Byte 0 | Byte 1 | Byte 2 | Byte 3 | Byte 4 | Byte 5 | Byte 6 | Byte 7 |
| Big-endian | Byte 7 | Byte 6 | Byte 5 | Byte 4 | Byte 3 | Byte 2 | Byte 1 | Byte 0 |
| Memory content | 0x11 | 0x22 | 0x33 | 0x44 | 0x55 | 0x66 | 0x77 | 0x88 |

64 bit value on Little-endian   64 bit value on Big-endian

Magic "G"      Magic "Z"     Type    Size
[{(0b01000111)(0b01011010)} {xx}   {xxxx}]
      8b                8b             16b      32b 64-bits/1 word

FIG.7

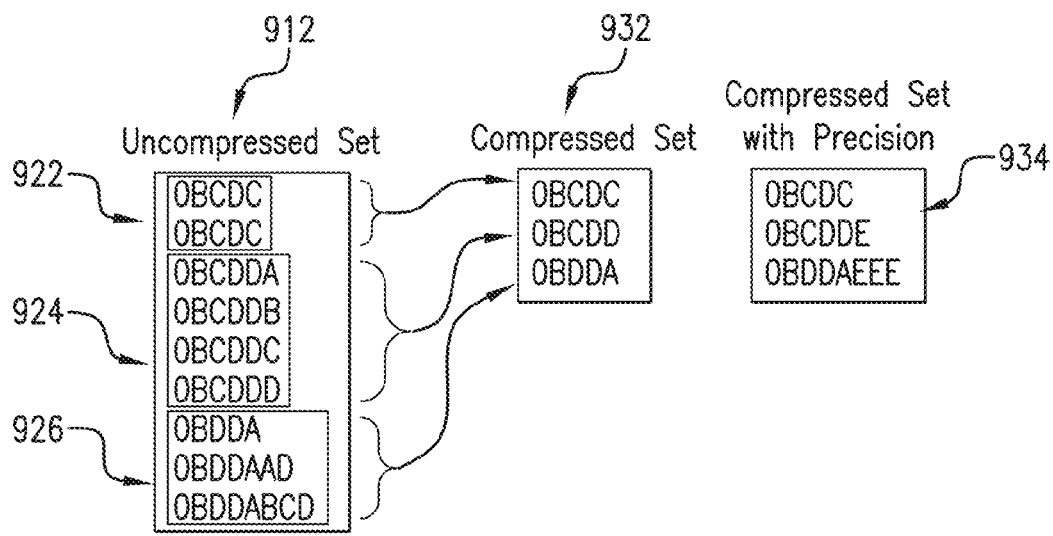
FIG. 9
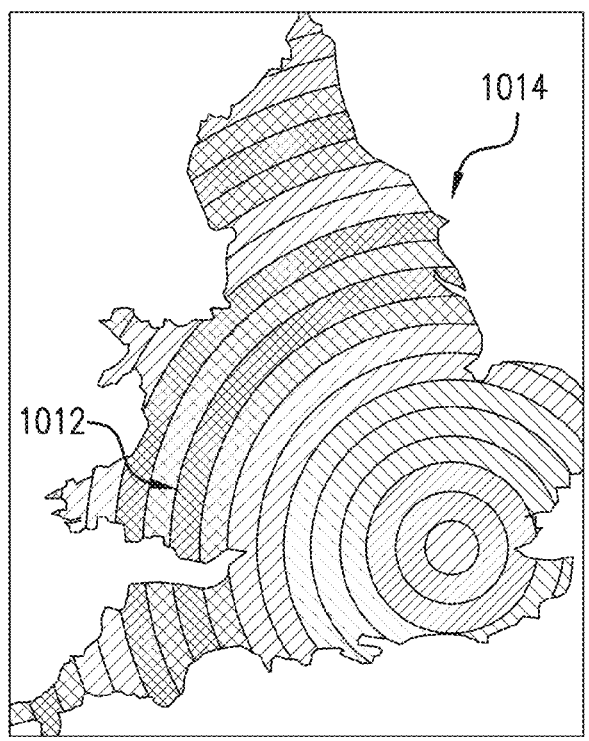
FIG. 10
1102
Extended ISO8601 Time Span
{$10^9$yrs}{$10^6$yrs}{$10^3$yrs}{100yrs}{10yrs}{years}
{months}{days}{hours}{minutes}{seconds}{1/10s}{1/100s}{ms}{μs}
{ns}{ps}{fs}{as}{zs}{ys}
FIG. 11

Table 3

Contextual Geohash Code IDs at 5 m precision for Chantilly, VA

| Level | Latitude | Longitude | Meridial Distance (Degrees) | Meridial Distance (meters) | Contextual Geohash Code ID |
|---|---|---|---|---|---|
| 0 | 38.8750 | -77.4025 | 180.00000000 | 20016000.000 | 0 |
| 1 | 38.8750 | -77.4025 | 90.00000000 | 10008000.000 | 0B |
| 2 | 38.8750 | -77.4025 | 45.00000000 | 5004000.000 | 0BC |
| 3 | 38.8750 | -77.4025 | 22.50000000 | 2502000.000 | 0BCA |
| 4 | 38.8750 | -77.4025 | 11.25000000 | 1251000.000 | 0BCAB |
| 5 | 38.8750 | -77.4025 | 5.62500000 | 625500.000 | 0BCABC |
| 6 | 38.8750 | -77.4025 | 2.81250000 | 312525.000 | 0BCABCA |
| 7 | 38.8750 | -77.4025 | 1.40625000 | 156262.500 | 0BCABCAA |
| 8 | 38.8750 | -77.4025 | 0.70312500 | 78131.250 | 0BCABCAAB |
| 9 | 38.8750 | -77.4025 | 0.35156250 | 39065.625 | 0BCABCAABD |
| 10 | 38.8750 | -77.4025 | 0.17578125 | 19532.813 | 0BCABCAABDB |
| 11 | 38.8750 | -77.4025 | 0.08789063 | 9766.406 | 0BCABCAABDBD |
| 12 | 38.8750 | -77.4025 | 0.04394531 | 4883.203 | 0BCABCAABDBDC |
| 13 | 38.8750 | -77.4025 | 0.02197266 | 2441.602 | 0BCABCAABDBDCB |
| 14 | 38.8750 | -77.4025 | 0.01098633 | 1220.801 | 0BCABCAABDBDCBC |
| 15 | 38.8750 | -77.4025 | 0.00549316 | 610.400 | 0BCABCAABDBDCBCD |
| 16 | 38.8750 | -77.4025 | 0.00274658 | 305.200 | 0BCABCAABDBDCBCDA |

FIG. 12

Table 3 (cont.)

| | | | | | |
|---|---|---|---|---|---|
| 17 | 38.8750 | −77.4025 | 0.00137329 | 152.800 | 0BCABCAABDBDCBCDAB |
| 18 | 38.8750 | −77.4025 | 0.00068665 | 76.300 | 0BCABCAABDBCBCDABA |
| 19 | 38.8750 | −77.4025 | 0.00034332 | 38.150 | 0BCABCAABDBCBCDABAA |
| 20 | 38.8750 | −77.4025 | 0.00017166 | 19.075 | 0BCABCAABDBCBCDABAAB |
| 21 | 38.8750 | −77.4025 | 0.00008583 | 9.538 | 0BCABCAABDBCBCDABAABD |
| 22 | 38.8750 | −77.4025 | 0.00004292 | 4.769 | 0BCABCAABDBCBCDABAABDB |
| 23 | 38.8750 | −77.4025 | 0.00002146 | 2.384 | 0BCABCAABDBCBCDABAABDBC |
| 24 | 38.8750 | −77.4025 | 0.00001073 | 1.192 | 0BCABCAABDBCBCDABAABDBCC |
| 25 | 38.8750 | −77.4025 | 0.00000536 | 0.596 | 0BCABCAABDBCBCDABAABDBCCA |
| 26 | 38.8750 | −77.4025 | 0.00000268 | 0.298 | 0BCABCAABDBCBCDABAABDBCCAC |
| 27 | 38.8750 | −77.4025 | 0.00000134 | 0.149 | 0BCABCAABDBCBCDABAABDBCCACC |
| 28 | 38.8750 | −77.4025 | 0.00000067 | 0.075 | 0BCABCAABDBCBCDABAABDBCCACCB |
| 29 | 38.8750 | −77.4025 | 0.00000034 | 0.037 | 0BCABCAABDBCBCDABAABDBCCACCB |
| 30 | 38.8750 | −77.4025 | 0.00000017 | 0.019 | 0BCABCAABDBCBCDABAABDBCCACCBB |
| 31 | 38.8750 | −77.4025 | 0.00000008 | 0.009 | 0BCABCAABDBCBCDABAABDBCCACCBAB |
| 32 | 38.8750 | −77.4025 | 0.00000004 | 0.005 | 0BCABCAABDBCBCDABAABDBCCACCBABA |

FIG. 12-1

METHOD AND APPARATUS FOR SITUATIONAL CONTEXT FOR BIG DATA

CROSS-REFERENCE TO RELATED APPLICATIONS

This application claims benefit of priority to U.S. Provisional Patent Application No. 61/838,441 filed Jun. 24, 2013 which is incorporated herein by reference in its entirety.

BACKGROUND

Field of the Invention

The present invention relates to a method and apparatus for processing geospatial data within a temporal context.

Related Art

As data volumes grow massive, measured in zettabytes or more, the capability for systems to dynamically discover, characterize, and sustain knowledge drawn from data is becoming an imperative for global commerce, businesses, and government entities.

SUMMARY

According to a first broad aspect, the present invention provides a method comprising the following steps: (a) constructing a boundary comprising a set of contextual square quadrangles, and (b) displaying to a user the boundary on a visual display device and/or saving the boundary to a storage medium, wherein each contextual square quadrangle of the set of contextual square quadrangles has a contextual geohash code ID, wherein each contextual geohash code ID has a length, and wherein each contextual square quadrangle of the set of contextual square quadrangles has a precision value based on the length of a contextual geohash code ID for the contextual square quadrangle.

According to a second broad aspect, the present invention provides an apparatus comprising: one or more processors, and a machine-readable medium for storing instructions thereon which when executed by the one or more processors cause the one or more processors to perform operations comprising the following steps: (a) constructing a boundary comprising a set of contextual square quadrangles, and (b) displaying to a user the boundary on a visual display device and/or saving the boundary to a storage medium, wherein each contextual square quadrangle of the set of contextual square quadrangles has a contextual geohash code ID, wherein each contextual geohash code ID has a length, and wherein each contextual square quadrangle of the set of contextual square quadrangles has a precision value based on the length of a contextual geohash code ID for the contextual square quadrangle.

According to a third broad aspect, the present invention provides a method comprising the following steps: (a) searching a set of contextual square quadrangles for one or more desired contextual square quadrangles meeting a set of search criteria, and (b) displaying to a user at least one desired contextual square quadrangles of the one or more desired contextual square quadrangles on a visual display device and/or saving the at least one desired contextual square quadrangles to a storage medium, wherein each contextual square quadrangle of the set of contextual square quadrangles has a contextual geohash code ID, wherein each contextual geohash code ID has a length, and wherein each contextual square quadrangle of the set of contextual square quadrangles has a precision value based on the length of a contextual geohash code ID for the contextual square quadrangle.

According to a fourth broad aspect, the present invention provides an apparatus comprising: one or more processors, and a machine-readable medium for storing instructions thereon which when executed by the one or more processors cause the one or more processors to perform operations comprising the following steps: (a) searching a set of contextual square quadrangles for one or more desired contextual square quadrangles meeting a set of search criteria, and (b) displaying to a user at least one desired contextual square quadrangle of the one or more desired contextual square quadrangles on a visual display device and/or saving the at least one desired contextual square quadrangles to a storage medium, wherein each contextual square quadrangle of the set of contextual square quadrangles has a contextual geohash code ID, where each contextual geohash code ID has a length, and wherein each contextual square quadrangle of the set of contextual square quadrangles has a precision value based on the length of a contextual geohash code ID for the contextual square quadrangle.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

FIG. 1 shows a table illustrating temporal interval comparisons for examples of the temporal conflation rules included within one embodiment of the contextual geohashing method of the present invention.

FIG. 4 shows a table of contextual geohash code IDs at 10 meter precision for (0° N, 0° E).

FIG. 6 is a diagram showing 64-bit endian examples.

FIG. 7 is a diagram showing a contextual geohash tag header.

FIG. 9 is a diagram showing contextual geohash code set compression examples.

FIG. 10 is a diagram show a fuzzy feature example according to one embodiment of the present invention.

FIG. 11 shows a contextual temporal tag time span range.

FIGS. 12 and 12-1 shows a table illustrating contextual geohash code IDs at 5 meter precision for the city of Chantilly, Va. according to one embodiment of the present invention.

DETAILED DESCRIPTION OF THE PREFERRED EMBODIMENTS

Definitions

Figure 2:
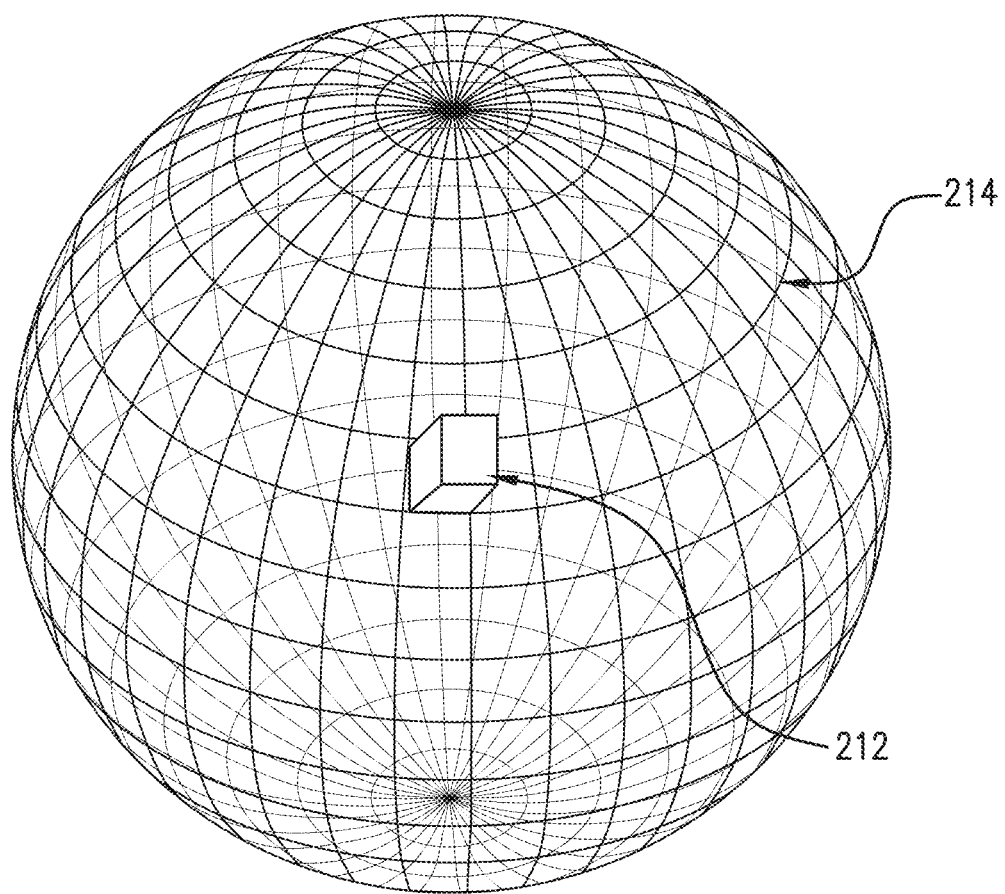
FIG. 2 shows diagram illustrating a contextual square quadrangle extruded from a graticule.

Where the definition of terms departs from the commonly used meaning of the term, applicant intends to utilize the definitions provided below, unless specifically indicated.

For purposes of the present invention, directional terms such as "top," "bottom," "upper," "lower," "above," "below," "left," "right," "horizontal," "vertical," "upward," "downward," etc., are merely used for convenience in describing the various embodiments of the present invention.

For purposes of the present invention, a value or property is "based" on a particular value, property, the satisfaction of a condition or other factor if that value is derived by performing a mathematical calculation or logical operation using that value, property or other factor.

For purposes of the present invention, the term "Big Data" refers to high volume, high velocity, and/or high variety information assets. Big Data requires non-traditional forms of processing to enable enhanced decision making, insight discovery, and process optimization. In general, Big Data represents a collection of data so large and complex (encompassing all types) that it becomes difficult to process using traditional data processing applications and/or database management systems.

For purposes of the present invention, the term "boundary" refers to any type of boundary between two areas of interest. For example: a boundary may be a terrain feature such as a river, mountain ridge, lake, etc.; a political boundary such as a boundary between two countries, two states within a country, two provinces within a country, between a city and one or more surrounding counties, two or more polling districts, etc.; a boundary between pieces of real estate; a boundary between a metropolitan area and the suburbs for the metropolitan area, etc.

For purposes of the present invention, the term "Catalog Service for the Web ebRIM (CSW-ebRIM)" refers to an OGC standard for exposing a catalog of geospatial records on the Internet via HTTP, which is built upon an OASIS standard called ebRIM (eBusiness Registry Information Model). CSW is analogous to a card catalog in a library and defines common interfaces to discover, browse, and query metadata about data, services, and other resources. CSW is comprised of multiple profiles, including ebRIM, which is extensible and contains both a Registry and a Repository, with the Registry objects referencing and pointing to the associated Repository items. Each repository item (e.g. an HTML document) has a Uniform Resource Name (URN), which is a Uniform Resource Identifier (URI) that uses the URN scheme. The URN allows the repository item to be readily retrieved from the Registry using a simple GET request (e.g. issued from a web client such as a browser).

For purposes of the present invention, the term "celestial hashing" refers to linking sources with a common view of the same location on the celestial sphere at the same time as entities move into and out of that view.

For the purposes of the present invention, the term "celestial sphere" refers to an imaginary sphere of arbitrarily large radius, concentric with a particular celestial body, such as the earth. Unless specified otherwise, the term "celestial sphere" refers to the celestial sphere of the earth.

For purposes of the present invention, the term "computer" refers to any type of computer or other device that implements software including an individual computer such as a personal computer, laptop computer, tablet computer, mainframe computer, mini-computer, etc. A computer also refers to electronic devices such as an electronic scientific instrument such as a spectrometer, a smartphone, an eBook reader, a cell phone, a television, a handheld electronic game console, a videogame console, a compressed audio or video player such as an MP3 player, a Blu-ray player, a DVD player, etc. In addition, the term "computer" refers to any type of network of computers, such as a network of computers in a business, a computer bank, the Cloud, the Internet, etc. Various processes of the present invention may be carried out using a computer. Various functions and methods of the present invention may be performed by one or more computers.

For purposes of the present invention, the term "computer system" refers to a system of interconnected computers.

For purposes of the present invention, the term "confidence set" refers to a set of contextual square quadrangles each having a confidence value at or above a threshold confidence value or each having a confidence value within a particular range of confidence values. For example, a set of contextual square quadrangles each having a confidence value of at least 95% would constitute a confidence set and may be referred to as a 95% confidence set. A set of contextual square quadrangles each having a confidence value between 70% and 80% could also constitute a confidence set and may be referred to as a 70%-80% confidence set. A 100% confidence set, i.e., set in which all of the contextual square quadrangles have a confidence value of 100% may be referred to as a particular geospatial feature such as a point, a line segment, a boundary, a geographic region, etc. This means that the example geospatial feature occurs at the place or location designated by the geohash set with 100% confidence. Features or locations are deemed "fuzzy" when associated with confidence values of less than 100% and locations with a collection of confidence sets represents differing degrees of fuzziness or geospatial ambiguity.

For purposes of the present invention, the term "confidence value" refers to a mathematical, statistical, or logical means for describing the context or an aspect of the aggregate context of a situation described at a place and time.

For purposes of the present invention, the term "conterminous" refers to having a common boundary or enclosed within one common boundary. It is related to the term coterminous. Conterminous is used to describe spatial relationships between various feature sets, including describing a spatial granule or spatial pattern.

For purposes of the present invention, the term "context" refers to the description of properties, attributes, or the descriptive state of an object or entity. By capturing the state of an object, that same state may be applied to the same object at some point in the future to return the object to the source state or context. This is critical for forensic analysis, workflow automation, and pattern matching and pattern recognition.

For purposes of the present invention, the term "contextual geohashing" refers to a method for uniquely delineating a place described on the Earth's surface, extending below the Earth's surface, and extending above the Earth's surface to potentially intersect with the celestial sphere. This place description includes context which may describe the likelihood that some aspects of the place description are more likely to occur than others providing the mechanism to describe some places as "fuzzy" or including spatial ambiguity. Although for simplicity in the description below contextual geohashing is generally only described with respect to the earth, contextual geohashing may be used on celestial bodies such as planets, asteroids, etc.

For purposes of the present invention, the term "contextual geohash code" refers to an ASCII string of variable length, where the length of the ASCII string is proportional to the depth of the modified quadtree comprised of square quadrangles used to describe that square quadrangle. For a contextual geohash code, level −1 (minus one) identifies the place as the entire Earth. For a contextual geohash code, level 0 of the contextual geohash code identifies the hemisphere in which the square quadrangle is located with an ASCII character such as 0 for the western hemisphere and 1 for the eastern hemisphere. Starting with level 1 of a contextual geohash code, the prior region (for example, the hemisphere of level 0) is subdivided into four square quadrangles following a Z-ordered pattern of the same four ASCII characters, such as A, B, C and D, in which the first ASCII character (A in this example) is the northwest component, the second ASCII character (B in this example) is the northeast component, the third ASCII character (C in this example) is the southwest component and the fourth ASCII character (D in this example) is the southeast component. Following this scheme, any contextual square quadrangle can be subdivided into four square quadrangles to define a new level. There are four exception cases used with contextual geohash codes to describe the poles, to describe the whole Earth, and to describe an unspecified location: (a) a single ASCII character such as "&" indicates the North Pole, (b) a single ASCII character such as "=" indicates the South Pole, (3) a single ASCII character such as "#" indicates the whole Earth, including both poles, and (4) a single ASCII character such as "?" indicates an unspecified location, which is used in conjunction with other types of hash codes, such as temporal hash codes.

For purposes of the present invention, the term "contextual geohash code ID refers to the contextual geohash code of specific contextual square quadrangle.

For purposes of the present invention, the term "contextual geohash point" refers to the geospatial point in latitude and longitude of the lower-left or southwest corner of a square quadrangle. This point combined with the precision level of the geohash code delineates the area or region of coverage for that geohash code. Contextual geohash points do not have a one-to-one relationship with geohash code IDs due to the change in scale associated with geohash codes with different levels.

For purpose of the present invention, the term "contextual geohash tag" refers to a type of contextual geohash code IDs, where ASCII character notion is one type of tag and various binary notations describe other equivalent tag types.

For purposes of the present invention, the term "contextual square quadrangle" refers to a square quadrangle having a contextual geohash code ID. A square quadrangle is defined using spherical angles. A contextual square quadrangle deterministically represents a distinct place on the Earth extending from the Earth's center out to the celestial sphere.

For purposes of the present invention, the term "contiguous" refers to a set of things in which each member of the set is in contact with another member of the set. For example, in one embodiment of the present invention a region of coverage may comprise a set of contextual quadrangles in which each geospatial quadrangle is in contact with another contextual square quadrangle of the set. However, non-contiguous or disjointed sets of quadrangles can also be used to describe places, such as Alaska and Hawaii included with the set of contiguous state boundaries.

For purposes of the present invention, the term "continuous time" refers to an unbroken span of time comprised of time instants. In the time domain, the value of a signal or function is known for all real numbers. Within a time granule, a time instant is described as a singular point in time with an associated precision. On a different system implementation capable of supporting greater descriptive precision, the lower precision time instant would convert into a time period with an interval defined at the limits of the describing precision.

For purposes of the present invention, the term "coordinate reference system (CRS)" refers to a coordinate system that is related to the real world by a datum. For geodetic and vertical data, the coordinate reference system is related to the Earth.

For purposes of the present invention, the term "coordinate system" refers to a set of mathematical rules for specifying how coordinates are to be assigned to points.

For purposes of the present invention, the term "coordinate" refers to one of a sequence of n numbers designating the position of a point in n-dimensional space. In a coordinate reference system, the numbers must be qualified by units.

For purposes of the present invention, the term "coordinate system" is set of mathematical rules for specifying how coordinates are to be assigned to points.

For purposes of the present invention, the term "data" means the reinterpretable representation of information in a formalized manner suitable for communication, interpretation, or processing. Although one type of common type data is a computer file, data may also be streaming data, a web service, etc. The term "data" is used to refer to one or more pieces of data.

For purposes of the present invention, the term "database" refers to a structured collection of records or data that is stored in a computer system. The structure is achieved by organizing the data according to a database model. The model in most common use today is the relational model. Other models such as the hierarchical model and the network model use a more explicit representation of relationships (see below for explanation of the various database models). A computer database relies upon software to organize the storage of data. This software is known as a database management system (DBMS). Database management systems are categorized according to the database model that they support. The model tends to determine the query languages that are available to access the database. A great deal of the internal engineering of a DBMS, however, is independent of the data model, and is concerned with managing factors such as performance, concurrency, integrity, and recovery from hardware failures. In these areas there are large differences between products.

For purposes of the present invention, the term "database management system (DBMS)" represents computer software designed for the purpose of managing databases based on a variety of data models. A DBMS is a complex set of software programs that controls the organization, storage, management, and retrieval of data in a database. DBMS are categorized according to their data structures or types. It is a set of prewritten programs that are used to store, update and retrieve a Database.

For purposes of the present invention, the term "database product" refers to a database compatible product that has been loaded into a database.

For purposes of the present invention, the term "data model" is the specification of the information required to describe the structure and organization of data, including geolocation of data, a valid time description of the data and of the way it is packaged with that data.

For purposes of the present invention, the term "data source" refers to any type data source, including data and services.

For purposes of the present invention, the term "discrete time" is non-continuous time. Sampling at non-continuous times results in discrete time samples described as time intervals. For example, a newspaper may report the price of crude oil once every 24 hours. In general, the sampling period in discrete-time systems is constant, but in some cases non-uniform sampling is also used. In contrast to continuous-time systems, where the behavior of a system is often described by a set of linear differential equations, discrete-time systems are described in terms of difference equations. Most Monte Carlo simulations utilize a discrete-timing method, either because the system cannot be efficiently represented by a set of equations, or because no such set of equations exists.

For purposes of the present invention, the term "displaying a contextual square quadrangle on a visual display device", unless specified otherwise, refers to displaying on the visual display device: an image of the contextual square quadrangle, the contextual geohash code ID of the contextual square quadrangle, and/or any other information about the contextual square quadrangle.

For purposes of the present invention, the term "geocoding" refers to the assignment of alphanumeric codes or coordinates to geographically reference data provided in a textual format. Examples are the two letter country codes and coordinates computed from addresses.

For purposes of the present invention, the term "ebRIM" refers to an ebXML language that provides an extensible content discovery framework on top of CSW. Because it is extensible, ebRIM provides a mechanism to implement situational context from multiple perspectives referenced from a URI that supports a RESTful interface.

For purposes of the present invention, the term "elevation hashing" refers to linking sources based on the height above a reference surface such as mean sea level.

For purposes of the present invention, the term "Gartner" refers to an information technology research and advisory company providing technology related insight.

For purposes of the present invention, the term "geohash set" refers to a set of contextual square quadrangles. A geohash set may be for any type of geographic feature or any portion of a geographic feature. A geohash set is implicitly associated with a 100% confidence value unless explicitly associated with a confidence value.

For purposes of the present invention, the term "geodetic coordinate system" refers to a coordinate system in which position is specified by geodetic latitude, geodetic longitude, and (in the three-dimensional case) ellipsoidal height.

For purposes of the present invention, the term "geodetic datum" refers to a datum describing the relationship of a coordinate system to the Earth. In most cases, the geodetic datum includes an ellipsoid description.

For purposes of the present invention, the term "geographic information system (GIS)" refers to an arrangement of computer hardware, software, and geographic data that people interact with to integrate, analyze, and visualize the data; identify relationships, patterns, and trends; and find solutions to problems. The system is designed to capture, store, update, manipulate, analyze, and display the geographic information. A GIS is typically used to represent maps as data layers that can be studied and used to perform analyses. This term is also known as geospatial information system or geospatial intelligence system.

For purposes of the present invention, the term "geohashing" refers to linking sources based on location.

For purposes of the present invention, the term "geolocation" refers to a mathematical correspondence between position in a grid coordinate system and position in a geodetic coordinate system.

For purposes of the present invention, the term "georeferenceable dataset" refers to a dataset with some additional information such as control points or orientation data that enable the process of georeferencing For purposes of the present invention, the term "georeferencing" refers to a process of determining the relation between the position of data in the instrument coordinate system and the geographic or map location of the data.

For purposes of the present invention, the term "Hadoop" refers to an open-source software framework that supports data-intensive distributed applications. Hadoop implements a computational paradigm named MapReduce (among others), where the application is divided into many small fragments of work, each of which may be executed or re-executed on any node in the cluster.

For purposes of the present invention, the term "hardware and/or software" refers to functions that may be performed by digital software, digital hardware, or a combination of both digital hardware and digital software. Various functions and methods of the present invention may be performed by hardware and/or software as appropriate.

For purposes of the present invention, the term "latitudinal" refers to a direction along or parallel to a line of latitude on the earth's surface.

For purposes of the present invention, the term "length of a contextual geohash code" refers to the number of ASCII characters in the contextual geohash code, which is proportional to the precision level of that geohash code.

For purposes of the present invention, the term "length of a contextual geohash code" refers to the number of ASCII characters in the contextual geohash code, which is proportional to the precision level of that geohash code.

For purposes of the present invention, the term "level" refers both to the quadtree depth and the corresponding precision of square quadrangle.

For purposes of the present invention, the term "line of latitude" refers to an imaginary line around the earth parallel to the equator.

For purposes of the present invention, the term "line of longitude" refers to any imaginary great circle on the surface of the earth passing through the north and south poles at right angles to the equator.

For purposes of the present invention, the term "longitudinal" refers to a direction along or parallel to a line of longitude on the earth's surface.

For purposes of the present invention, the term "machine-readable medium" refers to any tangible or non-transitory medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" includes, but is not limited to solid-state memories, and optical and magnetic media. Specific examples of machine-readable media include non-volatile memory, including by way of example, semiconductor memory devices, e.g., EPROM, EEPROM, and flash memory devices; magnetic disks such as internal hard disks and removable disks; magneto-optical disks; and CD-ROM and DVD-ROM disks. The term "machine-readable medium" may include a single medium or multiple media (e.g., a centralized or distributed database, and/or associated caches and servers) that store the one or more instructions or data structures.

For purposes of the present invention, the term "MapReduce" refers to a programming model for processing large data sets with a parallel, distributed algorithm on a cluster. MapReduce is a framework for processing parallelizable problems across huge datasets using a large number of computers (nodes), collectively referred to as a cluster (if all nodes are on the same local network and use similar hardware) or a grid (if the nodes are shared across geographically and administratively distributed systems, and use more heterogeneous hardware). Computational processing can occur on data stored either in a file system (unstructured) or in a database (structured).

For purposes of the present invention, the term "Microdata" refers to a new Web 3.0 (Semantic Web) GEOINT content specification implemented in XML that supports the management of all data types with associated situational context (what, where, and when). Microdata is capable of managing and characterizing everything in all types of data using Unicode encodings (all content and meta-content), indexing everything for standards-based discovery, and versioning everything from a bi-temporal (valid time and transactional time) perspective.

For purposes of the present invention, term the "microprocessor" refers to a computer processor contained on an integrated circuit chip, such a processor may also include memory and associated circuits. A microprocessor may further comprise programmed instructions to execute or control selected functions, computational methods, switching, etc. Various processes of the present invention may be carried out using a microprocessor.

For purposes of the present invention, the term "motion hashing" refers to linking sources along a path of motion in 4D space i.e., in terms of latitudinal-longitudinal-location, elevation and time.

For purposes of the present invention, the term "National System for Geospatial-intelligence (NSG)" refers to the combination of technology, policies, capabilities, doctrine, activities, people, data, and communities necessary to produce geospatial intelligence in an integrated multi-intelligence, multi-domain environment.

For purposes of the present invention, the term "nested set of contextual square quadrangles" refers to a set of square quadrangles wherein each square quadrangle of increasing precision shares part of its contextual geohash code with the square quadrangle one level above it. For example, a set of square quadrangles having the following contextual geohash code IDs would be a nested set of contextual square quadrangles: 1A, 1AC, 1ACA, 1ACAD, and 1ACADB.

For purposes of the present invention, the term "network" refers to a telecommunications network used to send and receive data. A "network" may be a computer network in which computers exchange data.

For purposes of the present invention, the term "N-Quads" refers to an extension of the N-Triples format that includes context defined as a URI. Within an N-Quad, context is synonymous with the name of an RDF sub-graph and is traditionally used to track a dimension, such as location.

For purposes of the present invention, the term "NSG Community" refers to the community comprised of the following organizations: Intelligence Community (IC), Joint Staff, Military Departments (to include the Services). NGA is the Functional Manager for the NSG Community.

For purposes of the present invention, the term "precision of a contextual geohash code" refers to the length, i.e., the number of ASCII characters in the contextual geohash code.

For purposes of the present invention, the term "precision of a contextual geohash code ID" refers to the length, i.e., the number of ASCII characters in the contextual geohash code ID.

For purposes of the present invention, the term "processor" refers to a device that performs the basic operations in a computer. A microprocessor is one example of a processor. Various functions and methods of the present invention may be performed by one or more processors.

For purposes of the present invention, the term "square quadrangle" refers to a region on earth or other celestial bodies having two latitudinal borders and two longitudinal borders, except at the poles where a "quadrangle" refers to region having one latitudinal border and two longitudinal borders due to convergence.

For purposes of the present invention, the term "storage medium" refers to any medium or media on which data may be stored for use by a computer system. Examples of storage include both volatile and non-volatile memories such as MRAM, ERAM, flash memory, RFID tags, floppy disks, Zip™ disks, CD-ROM, CD-R, CD-RW, DVD, DVD-R, flash memory, hard disks, optical disks, etc.

For purposes of the present invention, the term "storing a contextual square quadrangle to a storage medium", unless specified otherwise, refers to storing on the storage medium: an image of the contextual square quadrangle, the contextual geohash code ID of the contextual square quadrangle, and/or any other information about the contextual square quadrangle.

For purposes of the present invention, the term "temporal hashing" refers to linking sources based on temporal alignment.

For purposes of the present invention, the term "visual display device," the term "visual display apparatus" and the term "visual display" refer to any type of visual display device or apparatus such as an LCD screen, touchscreen, a CRT monitor, LEDs, a projected display, a printer for printing out an image such as a picture and/or text, etc. A visual display device may be a part of another device such as a spectrometer, a computer monitor, a television, a projector, a cell phone, a smartphone, a laptop computer, a tablet computer, a handheld music and/or video player, a personal data assistant (PDA), a handheld game player, a head mounted display, a heads-up display (HUD), a global positioning system (GPS) receiver, etc.

For purposes of the present invention, the term "World Geodetic System (WGS)" refers to a standard for use in cartography, geodesy and navigation. The latest revision is WGS84.

DESCRIPTION

Situational context is a mechanism for characterizing information from data. Using the situational context associated with information, in one embodiment, the present invention can dynamically build relationships between disparate sources of information describing common topics to compile knowledge on these topics.

In one embodiment, the present invention employs a number of techniques to discover multidimensional relationships between disparate sources of data and/or information. One of these techniques is called hashing. In one embodiment, the present invention includes hashing techniques for geohashing (linking sources based on location), temporal hashing (linking sources based on temporal alignment), elevation hashing (linking sources based on the height above a reference surface such as mean sea level), motion hashing (linking sources along a path of motion in 4D space based on location, elevation and time), and celestial hashing (linking sources with a common view of the same location on the celestial sphere at the same time as entities move into and out of that view), among others. Many of these techniques build upon other techniques, such as celestial hashing, which can be used to describe the weather and environmental state (solar radiation, lunar radiation) that moves over a specific location and timeframe.

In one embodiment, the present invention provides a method for describing situational context, i.e., what, where and when information for Big Data using multidimensional hashing techniques to dynamically build content level relationships between disparate sources. In this sense, situational context is a mechanism used to transform data into information and then conflate that information into knowledge. The pedigree of these processes frequently includes model-based inferences drawn from different perspectives, including socio-cultural, sensors, or scale; hence, knowledge inherits the situational context of the perspectives, information, and data used to compile and dynamically sustain that knowledge. Challenges for Big Data include capture, storage, search, transform, analysis, and visualization of this data.

One significant type of Big Data is social media, which refers to a group of Web 2.0 mobile apps and web-based Internet applications that enable the creation and exchange of global multi-lingual user-generated content. Social media technologies include a variety of forms, including magazines, Internet forums, blogs, microblogs, wilds, and social networks, among others. Social media is created in all languages, dialects, and many different orthographies as a streaming source of Big Data.

As data volumes grow massive, measured in zettabytes or more, the capability for systems to dynamically discover, characterize, and sustain knowledge drawn from data is becoming an imperative for global commerce, businesses, and especially the US Government. Situational context describes the information state about something real described in data, perspectives in information, and inferred relationships in knowledge. Examples of data include an event like the 2013 Boston Marathon bombing, a blog story, a map, satellite image or a published report from an authoritative source. A related example of information perspectives is the social media opinion of an event like the 2013 Boston Marathon bombing, which can include sentiments ranging from outrage to support for limiting personal liberties. Finally, a small example of knowledge related to this same event could include logistical plans for the Marathon, live data feeds describing reactions to the event, and predictions of likely outcomes related to an evolving event.

Every source of data contains some type of content and some type of meta-information that describes the source of that content. While situational context is much more than traditional metadata, it does encompass any available metadata for a source. Essentially, situational context is used to describe the spatial, temporal, and thematic contexts of data as information to facilitate the conflation of related content drawn from multiple perspectives into knowledge. Knowledge that is managed and sustained to maintain currency provides the best means to affect decision making or provide actionable situational intelligence. Since GEOINT describes data, information, and knowledge that includes geospatial (spatial) and temporal dimensions, a supposition can be made that all data is GEOINT; thus, Big Data is synonymous with GEOINT described for multiple domains and from multiple perspectives, including both historic and predictive ones, supporting a diverse set of communities of interest (COI) globally.

Microdata is a new Web 3.0 (Semantic Web) compatible GEOINT content specification implemented in XML that supports the management of all types of data with associated situational context information. Microdata is capable of managing and characterizing everything found in all types of data using Unicode encodings (all content and meta-content), indexing everything for standards-based discovery, and versioning everything from a bi-temporal (valid time and transaction time) perspective. An example of a new type of GEOINT content is streaming multi-lingual social media data.

Emerging Microdata stores, such as MarkLogic®, can store descriptive or contextual information about GEOINT content n-dimensionally using various XML-based languages, such as Resource Description Framework (RDF). Traditional relational data models, such as Microsoft® Excel® spreadsheets or Oracle® database tables, store data following a structured data model of cells or fields, defined by columns and rows within a table. The resulting structured data can be efficiently managed by modern relational database management systems (RDBMS). However, data that does not fit within a defined relational structure cannot be efficiently stored by these types of systems and is generally lost.

Unstructured information refers to that data that does fit well into a relational table, including text-heavy content but may include dates, numbers, or facts as well. XML and its various languages, such as RDF, provide a robust means (n-dimensional graph-based solution) for describing and then managing unstructured content, such as situational context information. A significant discriminator between Microdata and more tradition relational data stores is that Microdata is specifically designed to store everything about everything in context. Thus, by using Microdata to manage GEOINT content, any aspect of that content can be associated with any number of esoteric or unique facts, perspectives, or versions.

As a Web 3.0 Semantic Web capability, Microdata is specifically designed to accommodate the massive content volumes associated with Big Data, contextually aligned in space, time, and thematic content. Within Microdata, everything is indexed and versioned using Unicode encodings supporting all languages. Unlike traditional RDF, which employs N-Triple structures to describe RDF graphs, Microdata employs N-Quads, which associates context with each N-Triple. From an Industry perspective, this type of context is used to name an RDF graph.

The context value within each N-Quad is a Uniform Resource Identifier (URI) that describes a context resource within an Open Geospatial Consortium (OGC) Catalog Service for the Web (CSW) ebRIM profile (CSW-ebRIM) discovery framework. Within this standards-based framework, global conflation business logic is included to dynamically build relationships between disparate GEOINT sources at the content level (sub-feature, sub-pixel, attribute). In one embodiment, the present invention may be used to describe these situational contexts.

Once situational context has been described, very large and complex RDF graphs can be defined as N-Quads managed within a Hadoop File System (HDFS), which supports Big Data analytic operations in MapReduce. This very large distributed management structure supported by a robust context-aware content discovery framework (CSW-ebRIM) provides the means for the dynamic selection of context specific sub-graphs to be extracted from HDFS and visualized or further analyzed efficiently. Thus, situational context described within Microdata represents an extensible, standards-based, domain specific description that can include multiple perspectives and versions, as well as conflation relationships between disparate sources.

CSW-ebRIM is an OGC standard for exposing a catalog of geospatial records on the Internet via HTTP. CSW is analogous to a card catalog in a library and defines common interfaces to discover, browse, and query metadata about data, services, and other resources. CSW is comprised of multiple profiles, including ebRIM, which is extensible and contains both a Registry and a Repository. The Registry objects point to the associated Repository items. Each repository item (e.g. an HTML document) has a Uniform Resource Name (URN), which is a URI that uses the URN scheme. The URN allows the repository item to be readily retrieved from the Registry using a simple GET request (e.g. issued from a web mapping client such as a browser).

The ebRIM provides a standards-based extensible content discovery framework that can be tailored to the specific needs of a COI while retaining more generic cataloging attributes to facilities domain specific content discoveries from a broader audience. In one embodiment of the present invention, new situational context extensions based on the contextual geohashing method of the present invention can be defined with ebRIM from multiple perspectives and tailored to serve specific COIs. These contexts would be referenced from a URI that could support a RESTful interface to override aspects of the defined situational context. This means that any given situational context associated with content can be independently discovered and repeatedly referenced by multiple resources via a standards-based web service.

In one embodiment of the present invention, additional discovery frameworks are included within the contextual geohashing method of the present invention, including an absolute dimensional referencing system that cross-references entities described via a UUID and contextual codes. Conflation is a mechanism that relates or links descriptions of the same thing (entity) found in distinct and separate sources. For instance, a lighthouse can be represented differently in three distinct data sources as an icon on a map, a detailed floor plan of the lighthouse, and a report describing the history of that lighthouse. Because all three sources are describing the same real entity, conflation can be used to build relationships between each of these data sources (at the content level) to build a more comprehensive knowledge-based description of the lighthouse entity itself. Dynamic conflation is a Big Data analytics method that leverages situational context to automatically build (through inferences) conflated relationships with corresponding confidence values (contexts) for each of these relationships. These automatically built relationships can be validated and/or enhanced by humans to create additional contextual versions for these relationships. All of the data that is linked is captured and described as evidence to support the rationale for establishing each link or relationship.

In one embodiment, the contextual geohashing method of the present invention enables the dynamic conflation of disparate sources at the content level (sub-feature, sub-pixel, attribute) by building relationships between data with situational context (information) using various Big Data analytic methods. One of these methods utilizes multidimensional hashing techniques that quantize a dimension of situational context information. A hashing technique is a method that uses a hash function to map a specific type of data of variable length into a set of fixed length data. From a relationship building methodology, hashing provides a dynamic means for linking (building relationships) disparate data content. Some of the hashing techniques supported by one embodiment of the contextual geohashing method of the present invention include: geohashing, temporal hashing, elevation hashing, motion hashing, and celestial hashing.

In one embodiment, the contextual geohashing method of the present invention provides an extensible framework for describing and characterizing situational contexts that can be encoded and decoded into Microdata. In one embodiment, the contextual geohashing method of the present invention may define situational context using a number of location-based, time-based, and thematic-based schemes. Each scheme quantizes the data dimensions of that scheme at a specified precision or resolution. For instance, in one embodiment, the contextual geohashing method of the present invention may provide a conflation surface for all high resolution orthorectified commercial imagery globally at a specified precision (e.g., 0.3 m, 5 mm, 1 ym) sequenced in time, by vendor and sensor. This means that every sub-pixel in every commercial image is quantized and related to every other corresponding sub-pixel in all overlapping images.

Just to describe the pixels in this surface at 0.3 meter precisions requires 9,007,199,254,740,990 (nine quadrillion, seven trillion, one hundred ninety-nine billion, two hundred fifty-four million, seven hundred forty thousand, nine hundred ninety) geospatial hashing codes. In one embodiment of the present invention, this seemingly impossibly large number can be addressed via the contextual geohashing method of the present invention by scalable compression techniques executing within a Big Data distributed computing environment using the Hadoop File System (HDFS) distributed across a large number of systems. Thus, in one embodiment, the contextual geohashing method of the present invention can dynamically conflate high resolution global imagery at the sub-pixel level, regardless of the type (full motion video, hyper-spectral), or volume of imagery, as well as any other type of data.

Situational context can be defined in multiple dimensions, including both geospatial and temporal dimensions among many others. Hashing is a technique designed to take complex data and relate it to similar data with the same dimensionality. Geohashing is a hierarchical latitude/longitude geocoding system that is used to index or address geospatial locations anywhere on the Earth. There are several geohashing solutions available, most of which merely describe a single point or a single quadrangle.

In one embodiment, the contextual geohashing method of the present invention provides an infinitely scalable areal notation scheme that scales in multiple dimensions, including temporal ones. This includes geohashing for any type of GEOINT content, including imagery/pixels, points, polylines, polygons, and complex areas. Hence, in one embodiment, the contextual geohashing method of the present invention can describe any feature on the Earth at millimeter precision or finer as necessary.

Temporal hashing is a method that quantizes date and time values into defined spans of time or intervals. This method replaces the continuous concept of an instant into a potentially infinitesimal interval. Sophisticated temporal hashing solutions, such as the contextual geohashing method of the present invention, can employ temporal interval comparisons to determine if multiple temporal representations can hash from multiple perspectives. Table 1 of FIG. 1 shows temporal interval comparisons for examples of the temporal conflation rules included within one embodiment of the contextual geohashing method of the present invention.

In one embodiment, the contextual geohashing method of the present invention may use perspectives of dimensional situational context to describe "fuzzy" content or content that includes ambiguities, such as geospatial or temporal. An example of a fuzzy feature might be the area controlled by a gang. Rival gang members, local police, and tourists may all have different perceptions of what and where this boundary is as it evolves through time. An example of fuzzy temporal data is the effect highway congestion can have on commuting times.

Using multiple dimensional hashing techniques, in one embodiment, the contextual geohashing method of the present invention provides the basis for implementing a global conflation model that utilizes the situational context of the data to conflate at the content level (sub-feature, sub-pixel, attribute). Given the potential volume of computation required for this type of activity, in one embodiment, the contextual geohashing method of the present invention employs hashing methods to support the Hadoop File Systems (HDFS) and MapReduce operations for Big Data analytics.

The terms data, information, and knowledge represent three overlapping abstract concepts. Data are qualitative and/or quantitative values that typically result from some type of measurement. Data without any context is difficult to interpret. Information results from the association of context (applying meaning) with data, generally from a defined set of perspectives. Knowledge is the collective assembly of related information drawn from across multiple perspectives. In this sense, information describes what data is and where and when it is relevant. Knowledge can then be thought of why and how the information is useful.

A situational context describes a framework for interpreting data (applying meaning) as information from a defined perspective and then relating disparate information into codified knowledge. Data is transformed into information through the association of multidimensional contexts, such as where the data is located, when it is relevant, and what it represents. The normalization of these contexts is one aspect of the framework that can be used to define situational context. Another aspect of this framework is the relating or conflation of disparate information using context.

A situational context is comprised of a number of multi-dimensional contexts. Many of these contexts are described as continuous phenomena. In one embodiment, the contextual geohashing method of the present invention provides a structured means to discretize various types of context utilizing a quantizing method that always associates a degree of precision with any contextual value. In this sense, in one embodiment, the contextual geohashing method of the present invention describes the geospatial context of an entity using a raster-based analogy rather than a vector one, where raster-based depictions are comprised of regions of discrete pixels that fill a continuous space, and the vector-based depictions are comprised of infinite geometries, such as points, lines, and polygons.

In one embodiment, the contextual geohashing method of the present invention employs various hashing schemes as the quantizing method for each dimensional context. Hashing is a deterministic method of mapping a complex representation into a simpler one. The hashing function is defined by an algorithm. By its very nature, most hashing functions are "lossy," i.e., some details are sacrificed or lost in exchange for new functionality; whereas, a lossless process loses no details.

There are a number of different types of dimensions that can be used to characterize data into information, just as there are many different perspectives that can be identified to interpret data as information. Two of the fundamental and broadly defined dimensions of data are space and time. These dimensions can be further describes as location, timeframe, elevation, and movement, which describes real entities that occupy space and move through time. Additional contexts can distinguish between relative and absolute frames of reference, environmental conditions (gravity, radiation), weather, and composition for instance. Each of these contexts is also described historically, presently, and predictively through time.

Contextual geohashing schemes according to one embodiment of the present invention are described as codes and are broadly defined within two format classes: text and binary. Text formats are named IDs and are designed to be human readable but are less efficient to process in volume. IDs are concise, since additional attributes can be associated with the hash codes externally. Binary formats are named tags and are specifically tuned for Big Data analysis operations, such as MapReduce. In one embodiment of the present invention, tags follow a standard hash code template that includes the following components: a magic number to identify the object as a subclass of a contextual geohashing scheme of the present invention, a hash code class that corresponds to hashing schemes; a hash code class type that provides numerous profiles for each hashing scheme, a size of object in 64-bit words.

In one embodiment, the contextual geohashing method of the present invention includes the following foundational multidimensional hashing schemes: contextual geohash codes for geohashing, contextual temporal hash codes for temporal hashing; contextual elevation hash codes for elevation hashing, contextual motion hash codes for hashing motion; contextual celestial hash codes for hashing the view of astronomical objects against a celestial sphere. Contextual geohash codes hash latitude and longitude locations on the Earth. Contextual temporal hash codes hash dates and times. Contextual elevation hash codes uniquely hash elevations, altitudes, or heights both above and below a defined datum. Motion context hash codes describe the movement of an object with a defined location, elevation, and timeframe to a new location, elevation, and timeframe. Contextual celestial hash codes enable the description of celestial bodies or other objects, such as weather, over a specified location and timeframe including motion of those celestial bodies or other objects.

In one embodiment, the contextual geohashing method of the present invention includes other contextual geohashing schemes associated with other foundational schemes. Some of these schemes are used to describe reference surfaces for gravity; pressure; various types of radiation; weather (including climate and weather predictions); and surface, sub-surface, and super-surface composition (air/water/soil/rock/geology); among others.

A contextual geohash code technique for hashing geospatial coordinates described in latitude, longitude, and a defined datum, such WGS84, at a specified precision (1 m). Traditional geohashing techniques, such as Geohash from www.geohash.org, hash a single geospatial point. Contextual geohashing is designed to hash any type of geospatial feature, including points, lines, polygons, and complex areas as sets of contextual geohash codes. A contextual geohash code is also infinitely scalable, which means that a contextual geohash code can support user defined precisions, such as 1 km, 5 mm, or $1 \times 10^{-24}$ m (1 yoctometer—the smallest limit for SI defined standard units in meters).

Contextual geohash codes are defined as square quadrangles sequenced following a Z-order (Morton code) curve within a modified quadtree structure. A quadrangle is a region on the Earth bounded by the graticule of lines of latitude and longitude as parallels and meridians. Meridians are defined as great-circles and parallels are defined as small circles except at the Equator or the poles. Due to convergence, the quadrangle parallel edge away from the Equator is slightly smaller than the parallel edge closer to the Equator; whereas, the meridional edges are both the same. A square quadrangle is one where the size in angular units, such as degrees, is the same for all edges of a quadrangle. FIG. 2 shows a contextual square quadrangle 212 extruded from a graticule 214. The length of each edge in a square quadrangle measured in angular units, such as degrees, is identical; hence, a square quadrangle. However, the length of an edge in a square quadrangle measured in length units, such as meters, is only the same for the two meridional edges and is different for each of the parallel edges. Meridional edges are great-circle arcs and are measured as great-circle distances, which represent the shortest distance between any two points on the Earth (assuming a spherical datum defining the figure of the Earth). Geodesics describe the shortest distance on the Earth when a more accurate ellipsoidal or geodetic datum is used as the figure of the Earth. Parallel edges follow rhumb lines (loxodromes) or lines of constant East or West bearing, which are not great-circle arcs.

Figure 3:
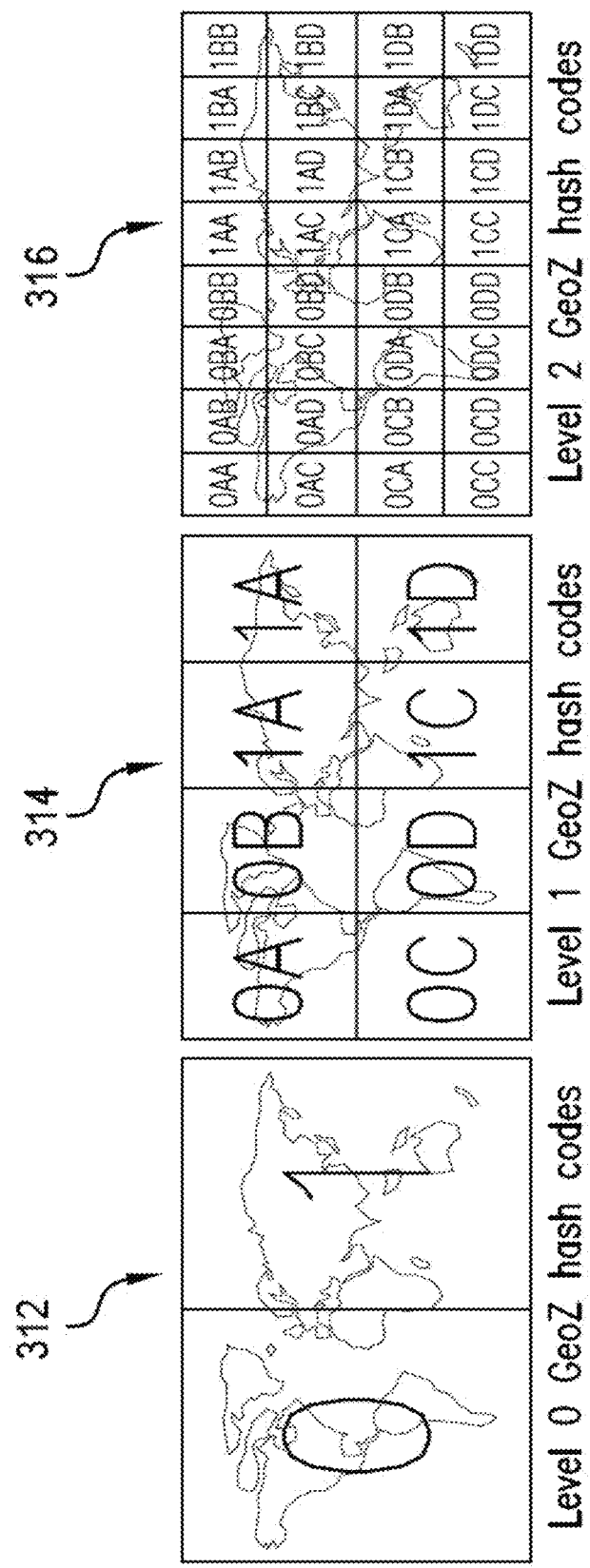
FIG. 3 shows three diagrams illustrating level 0 contextual geohash codes, level 1 contextual geohash codes, and level 2 contextual geohash codes according to one embodiment of the present invention.

A contextual geospatial quadrangle is described by a contextual geohash code ID, which is anchored to the southwest corner of the quadrangle with an assumed datum of WGS84. Contextual geohash codes are described by a variety of notations. A contextual geohash code ID is an ASCII string (human readable) of variable length, where the length of the ID string is proportional to the depth level of the quadtree comprised of square quadrangles used to describe that quadrangle. FIG. 3 shows contextual geohash for level 0 through level 2 according to one embodiment of the present invention. Levels beyond level 2 continue with this hierarchical pattern. Contextual geohash codes for level 0 are shown in diagram 312, contextual geohash codes for level 1 are shown in diagram 314, and contextual geohash codes for level 2 are shown in diagram 314.

A contextual geohash code ID has a standard form with four exceptions. The first character in the ASCII standard form must be either "0" for the western hemisphere or "1" for the eastern hemisphere. This denotes level 0, where levels describe both the quadtree depth and the corresponding precision of the described quadrangle. Starting with level 1, the prior region (in this case a hemisphere) is subdivided into four square quadrangles following a Z-order pattern labeled "A, B, C, or D". Quadrangle "A" is always the northwest component; Quadrangle "B" is always the northeast component; Quadrangle "C" is always the southwest component; and Quadrangle "D" is always the southeast component. Following this scheme, any contextual square quadrangle can be subdivided into four square quadrangles to define a new level.

By design, quadtree structures are spatially hierarchical and therefore highly compressible. These features enable a contextual geohash code ID to support an infinite quadtree depth and corresponding precision, but a practical limit can be drawn from the International System of Units (SI) used by the metric system. The SI unit of length is the meter (m) and the smallest defined meter is the yoctometer, which is defined as 1×10-24 m. Thus, a contextual geohash code ID describes a lettered pattern (A-D) repeatedly until the appropriate depth level is reached to describe the precision for the contextual geohash code ID. For example, if a level 4 contextual geohash code ID is described for (0° N, 0° E) is would be labeled as "1ACCC". To reduce the precision of this ID to level 3, the last character is truncated producing "1ACC".

Table 2 of FIG. 4 shows contextual geohash code IDs at 10 meter precision for (0° N, 0° E) according to one embodiment of the present invention.

In some cases, a higher level quadrangle may need to be represented at a lower level precision. When the extra precision is warranted, subsequent levels for precision are labeled with "E". If this same quadrangle (0° N, 0° E) needed to be described with level 7 precision (1.4063° or 156,262.5 m in meridional distance), it would be labeled as "1ACCCEEE".

Figure 5:
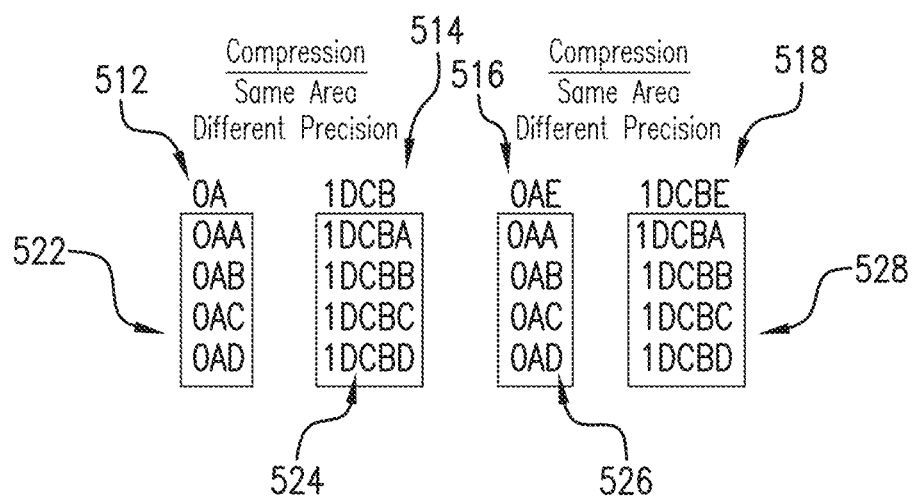
FIG. 5 shows contextual geohash code compression examples according to one embodiment of the present invention.

FIG. 5 shows contextual geohash code compression examples and illustrates how contextual geohash codes can be compressed to either retain the original precision or to generalize that precision. In this figure, each column, i.e., columns 512, 514, 516 and 518, represents a different example. In column code sets 522, 524, 526 and 528 each represent a set of codes that can be compressed into the contextual geohash code at the top of each column following the quadtree notational scheme. In columns 512 and 514 the contextual geohash code at the top of the column has a different precision than the other contextual geohash codes in the column. In columns 516 and 518 the contextual geohash code at the top of the column has the same precision as the other contextual geohash codes in the column. The "E" label is used to retain the precision of a compressed quad or complete set of contextual geohash codes.

In one embodiment of the present invention in which alphanumeric codes are used for contextual geohash code IDs there are four exception cases used with the contextual geohash code IDs to describe the poles, to describe the whole Earth, and to describe an unspecified location. The labels for these exceptions are as follows: (1) a single character of "&" indicates the North Pole, (2) a single character of "=" indicates the South Pole, (3) a single character of "#" indicates the whole Earth, including both poles, and (4) a single character of "?" indicates an unspecified location, which is used in conjunction with other types of hash codes, such as temporal hash codes.

In one embodiment of the present invention anchor point for the southernmost contextual geohash code quadrangles is slightly greater than the South Pole by an imperceptible distance and does not include the South Pole. The northernmost contextual geohash code ID quadrangles do not include the North Pole, but fall just short of it by an imperceptible distance.

Similar to contextual geohash codes, a contextual geohash tag is a binary object that describes a contextual geohash code specifically designed for use in Big Data operations, such as MapReduce. Contextual geohash tags are numbered sequentially as they are defined, starting with contextual geohash tag #1. Because there are a number of different computing architectures, many with different optimization requirements, contextual geohash tags may be implemented in a number of different types, where each type is uniquely named and described via a specification. Because contextual geohash codes are optimized for Big Data analytics, tag specifications are described at the octet or bit level within a specified word size, which is frequently tailored to 64-bits.

Whenever defining binary objects specifications, the details for how information is encoded (byte-ordering or endianness). A big-endian machine stores the most significant byte first and a little-endian machine stores the least significant byte first. In one embodiment, the method and apparatus of the present invention can support any type of binary architecture with the definition of different types. FIG. 6 shows 64-bit endian examples to illustrate the differences between these byte ordering methods.

In one embodiment of the present invention, all contextual geohash tags include the same header, which comprises the first word or 64-bits of the type. There are three components to the type header: (1) magic number, which corresponds to "GZ" in ASCII; (2) type number (there are 65,535 possible types); and (3) the size, which describes the number of 64-bit words in the type. FIG. 7 shows the logical layout of a contextual geohash tag header 702.

Figure 8:
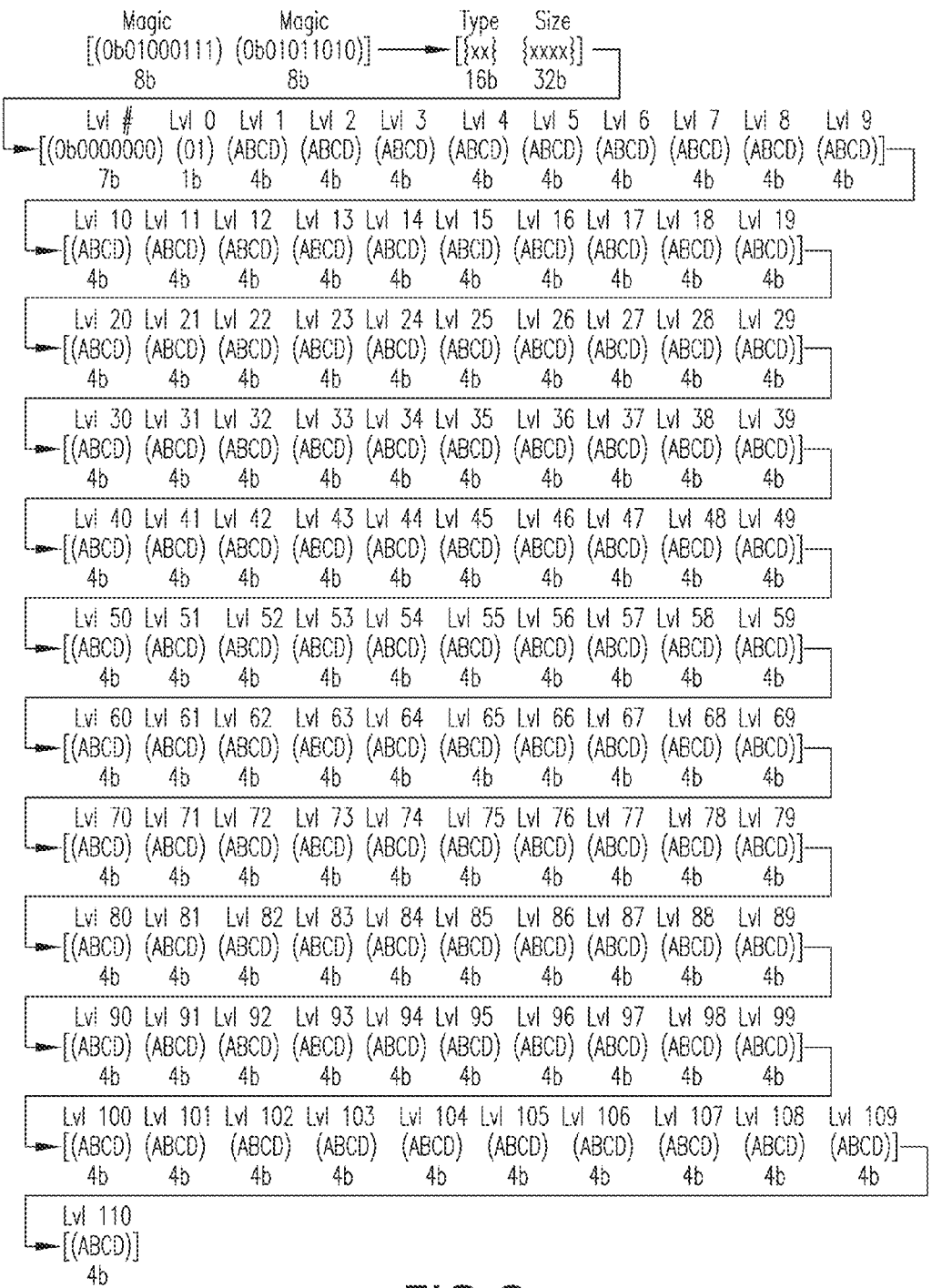
FIG. 8 is a diagram showing an example of a contextual geohash code to level 110 according to one embodiment of the present invention.

In one embodiment of the present invention, contextual geohash tag #1 describes the binary type for a contextual geohash tag code that is based upon the WGS84 datum and includes up to 110 levels. The specific precision for level 110 is 154.087 ym (one hundred fifty-four thousand, eighty-seven hundred-octillionths of a meter). The logical type layout for a contextual geohash tag #1 according to one embodiment of the present invention is shown in FIG. 8.

Unlike traditional geohashing schemes, in one embodiment, the contextual geohashing method of the present invention uses a set of contextual geohash codes to describe and delimit a region with an explicit precision. This means that contextual geohash codes can be used to describe any type of feature, ranging from a point to a complex area including islands and/or disjointed regions anywhere on the Earth. Contextual geohash code sets can include extremely large numbers of contextual geohash codes, especially if a complex region is described with a high level of precision.

FIG. 9 shows contextual geohash set compression examples. Left box 912 represents an uncompressed contextual geohash set, including three subsets (shown in boxes), i.e., subsets 922, 924 and 926, that could be compressed. Middle box 932 represents a corresponding compressed set and the right box 934 represents a corresponding compressed set that maintains the precision of the original sources.

Compression occurs once the set has been sorted (MapReduce operation on large sets) and identical adjacent codes are thinned, a quad exists (A-D codes for the same level can be compressed to the level above), or a superset exists. A superset is a higher level that encompasses a lower level.

Fuzzy features are geospatial objects that are described with some degree of ambiguity for the spatial extents of those objects. FIG. 10 illustrates this concept through concentric colored rings 1012 (shown as different fill patterns in FIG. 10) within a feature extent, i.e., geographic entity 1014 (England and Wales). This type of fuzzy feature can be implemented within one embodiment of the present invention by defining a set for each of the colored sub-regions. Each set would also be associated with a description of the confidence value and method used to estimate or infer the likelihood of that sub-region being part of the actual feature. By combining contextual geohash code sets into larger geohash code sets, any time of geospatial ambiguity can be characterized and described.

Because each contextual geohash set can be filtered from any other set of sub-feature sets, multiple perspectives can be supported for how fuzziness is defined for any given feature. In one embodiment, fuzziness may be applied to all other dimensional codes of the contextual geohashing method of the present invention.

A contextual temporal geohash code of the present invention is a technique for hashing descriptions of time in temporal units, such as seconds or years. The contextual geohashing method of the present invention may be used with several depictions of time. In one embodiment of the present invention contextual temporal geohash codes may be aligned with the ISO 8601 specification for data and time.

For example, in one embodiment of the present invention, contextual temporal geohash tag #1 defines an extended time format based on ISO 8601 that spans from a trillion years ago to a trillion years in the future with a precision measured in yoctoseconds ($10^{-24}$ s). FIG. 11 shows a contextual temporal geohash tag time span range 1102 for a detailed description of the date layout for this tag. As shown in FIG. 11, contextual temporal geohash tag #1 extends ISO 8601 to address a trillion years in the past and future at the precision of a yoctosecond ($10^{-24}$ s). Time spans that span year zero must be split into a negative tag followed by a positive tag.

Confidence

Confidence is used to describe the likelihood that something occurs at the place described by contextual geohash codes. One embodiment of confidence is "fuzzy" geography or places. In each of these examples, some level of uncertainty is associated with the description of place. Any given description of place can be represented from differing perspectives including differing extents and associated confidence values. For instance, The U.S. State Department may define a given international boundary authoritatively from the U.S. perspective. A local tribesman living near the border of that international boundary may define this same border differently from his local cultural perspective.

Boundary

A boundary is used to delineate a place described using contextual geohash tags. Boundaries are associated with confidence values and may be distinct or fuzzy. Implemented as sets of contextual geohash codes, boundaries can describe any place with a multitude of confidences asscoaited withinn a variety of perspectives that are valid with defined time spans, which can also be defined with ambiguity or fuzziness.

Search

Within Big Data, the discovery of distinct data is challenging given the overall volume of data as well as the distributed fashion in which that data is stored and/or managed. Contextual geohash codes represent meta information that can be associated with data to provide a fast and scalable means to deterministacally identify relevant data given a sepcified set of seach criteria. In this sense, disparate data can be dynamically conflated or related to other data during a search process.

Additional features of the present invention are described in the examples below.

EXAMPLES

Example 1

Table 3 of FIG. 12 shows contextual geohash code IDs at 5 meter precision for the city of Chantilly, Va.

Example 2

Figure 13:
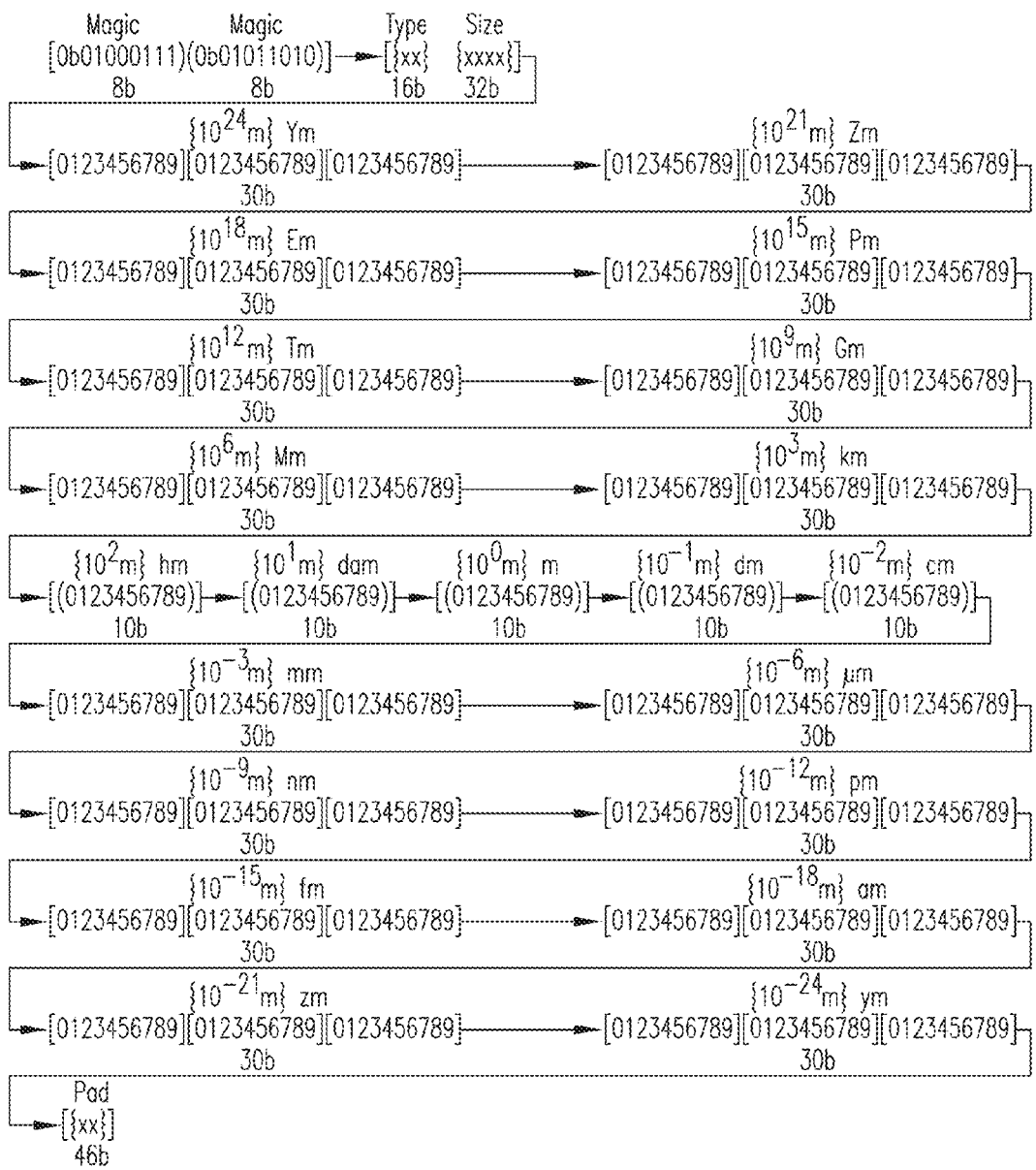
FIG. 13 is a diagram showing an example of a contextual elevation geohash tag according to one embodiment of the present invention.

FIG. 13 is a diagram showing an example of a contextual elevation geohash tag according to one embodiment of the present invention.

Example 3

Figure 14:
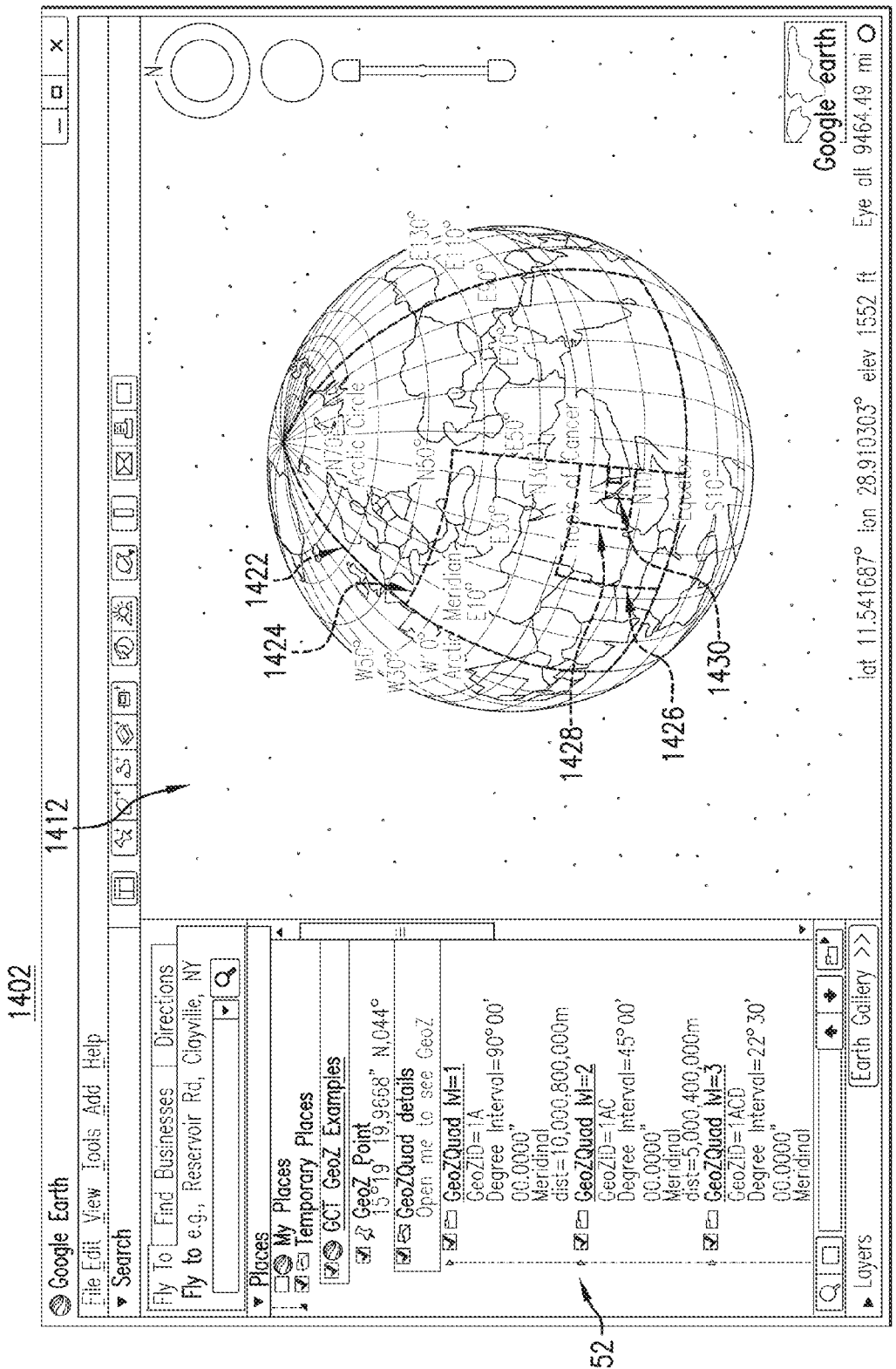
FIG. 14 is a screenshot showing a global view that includes contextual square quadrangles, where differing contexts are illustrated using different colors (shown as different dash-bordered quadrangles in FIG. 14) and transparency values, according to one embodiment of the present invention.

FIG. 14 shows window 1402 on a visual display device of a computer implementing one embodiment of a method according to the present invention. Window 1402 provides a global view 1412 that includes contextual square quadrangles 1422, 1424, 1426, 1428 and 1430 according to one embodiment of the present invention. Contextual square quadrangles 1422, 1424, 1426, 1428 and 1430 are a nested set of contextual square quadrangles. A hierarchical selection menu 1452 shows the levels and contextual geohash code IDs of quadrangles displayed in window 1402, i.e., contextual square quadrangles 1422, 1424, 1426, 1428 and 1430. Hierarchical selection menu 1452 allows a user to select that contextual geohash point be displayed.

Example 4

Figure 15:
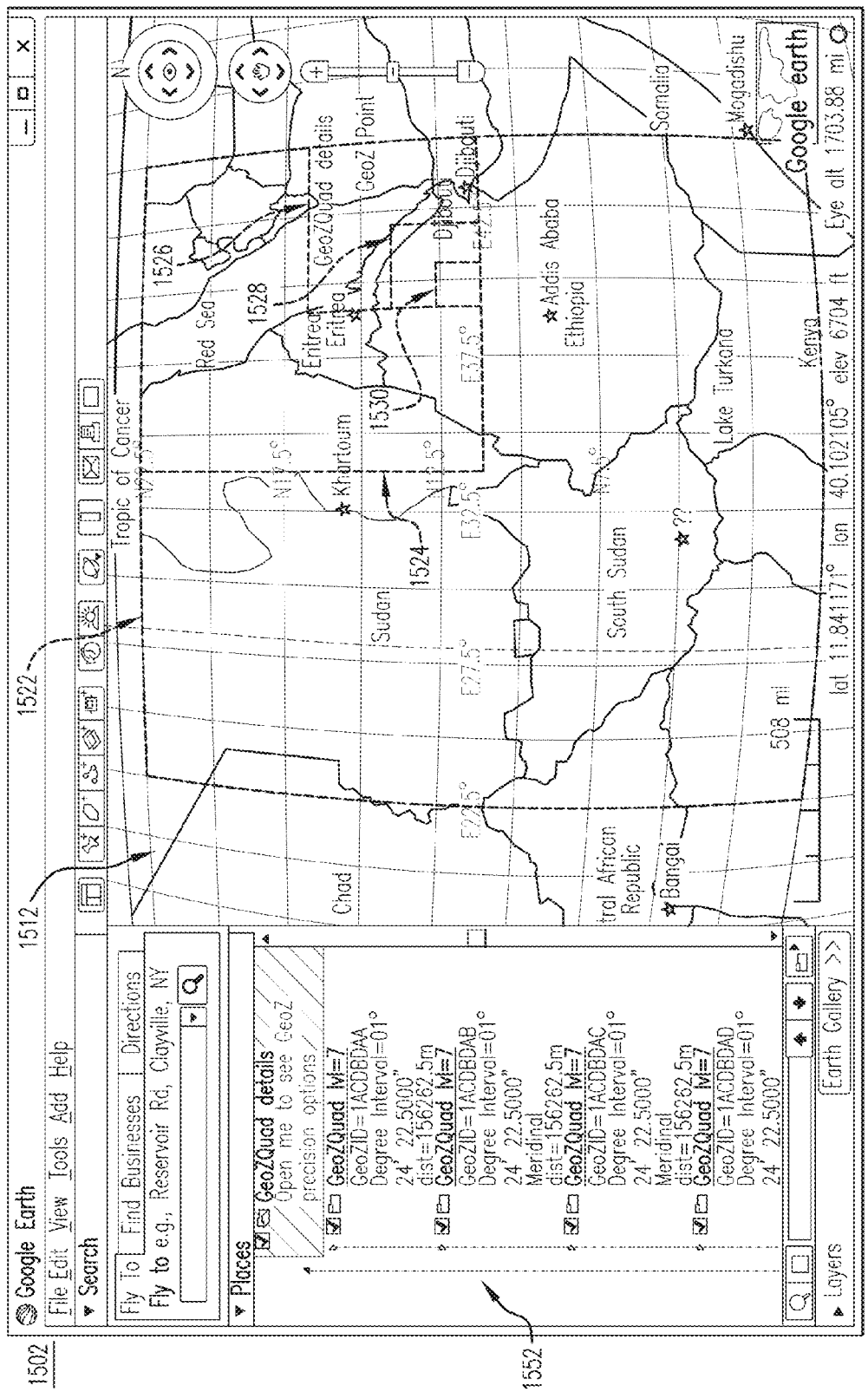
FIG. 15 is a screenshot showing a medium scale view that includes contextual square quadrangles, where differing contexts are illustrated using different colors (shown as different dash-bordered quadrangles in FIG. 15) and transparency values, according to one embodiment of the present invention.

FIG. 15 shows window 1502 on a visual display device of a computer implementing one embodiment of a method according to the present invention. Window 1502 provides a medium view 1512 that includes contextual square quadrangles 1522, 1524, 1526, 1528 and 1530 according to one embodiment of the present invention. Contextual square quadrangles 1522, 1524, 1526, 1528 and 1530 are a nested set of contextual square quadrangles. Also shown in window 1502 is a contextual geohash point 1542 that is indicated by a thumbtack icon. A hierarchical selection menu 1552 shows the levels and contextual geohash code IDs of quadrangles displayed in window 1502, i.e., contextual square quadrangles 1522, 1524, 1526, 1528 and 1530. Hierarchical selection menu 1552 allows a user to select that contextual geohash point 1542 be displayed.

Example 5

Figure 16:
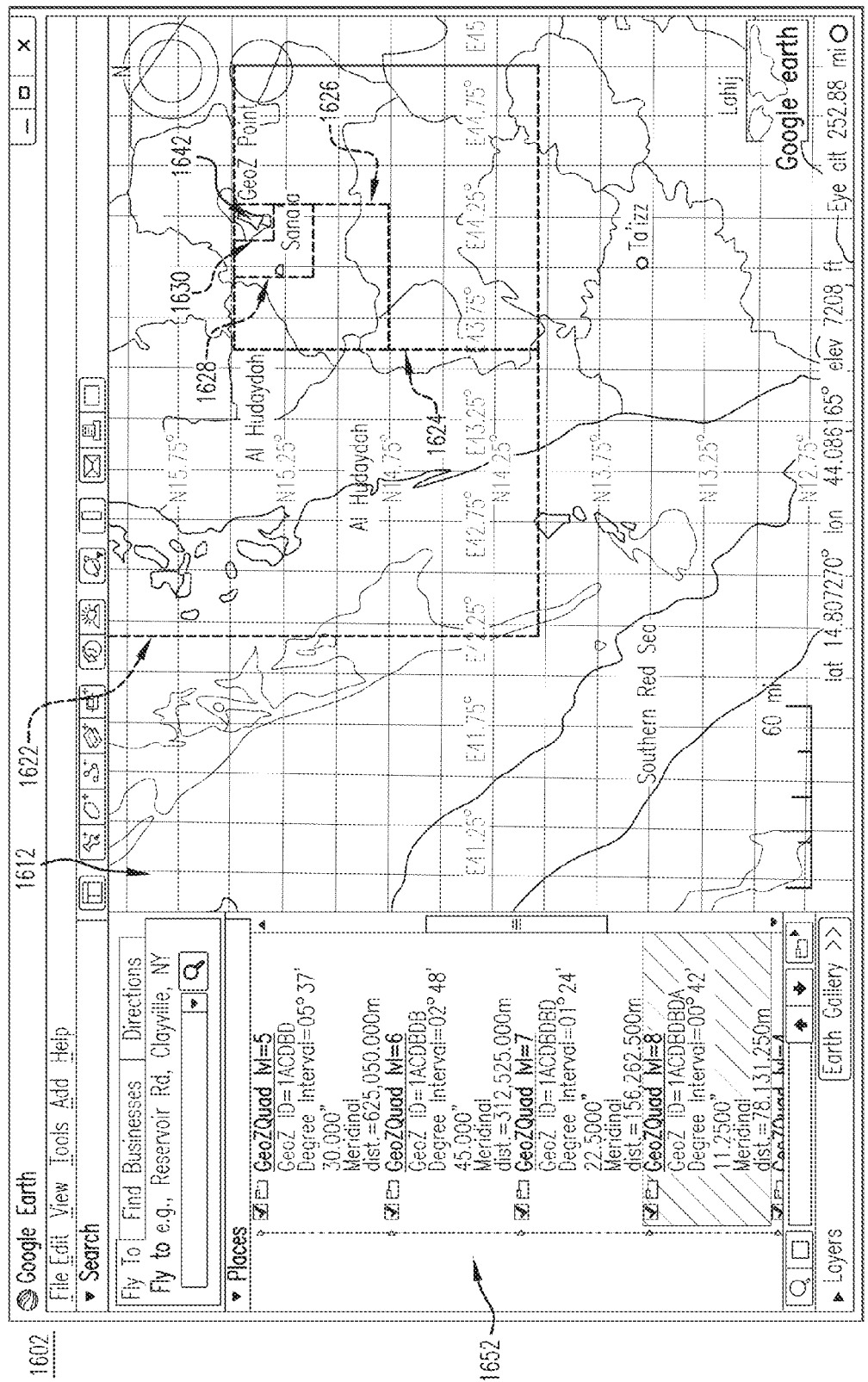
FIG. 16 is a screenshot showing a regional scale view that includes contextual square quadrangles, where differing contexts are illustrated using different colors (shown as different dash-bordered quadrangles in FIG. 16) and transparency values, according to one embodiment of the present invention.

FIG. 16 shows window 1602 on a visual display device of a computer implementing one embodiment of a method according to the present invention. Window shows a regional view 1612 that includes contextual square quadrangles 1622, 1624, 1626, 1628 and 1630 according to one embodiment of the present invention. Contextual square quadrangles 1622, 1624, 1626, 1628 and 1630 are a nested set of contextual square quadrangles. Also shown in window 1602 is a contextual geohash point 1642 that is indicated by a thumbtack icon that is located in contextual square quadrangle 1630. A hierarchical selection menu 1652 shows the levels and contextual geohash code IDs of quadrangles displayed in window 1602, i.e., contextual square quadrangles 1622, 1624, 1626, 1628 and 1630. Hierarchical selection menu 1652 allows a user to select that contextual geohash point 1642 be displayed.

Example 6

Figure 17:
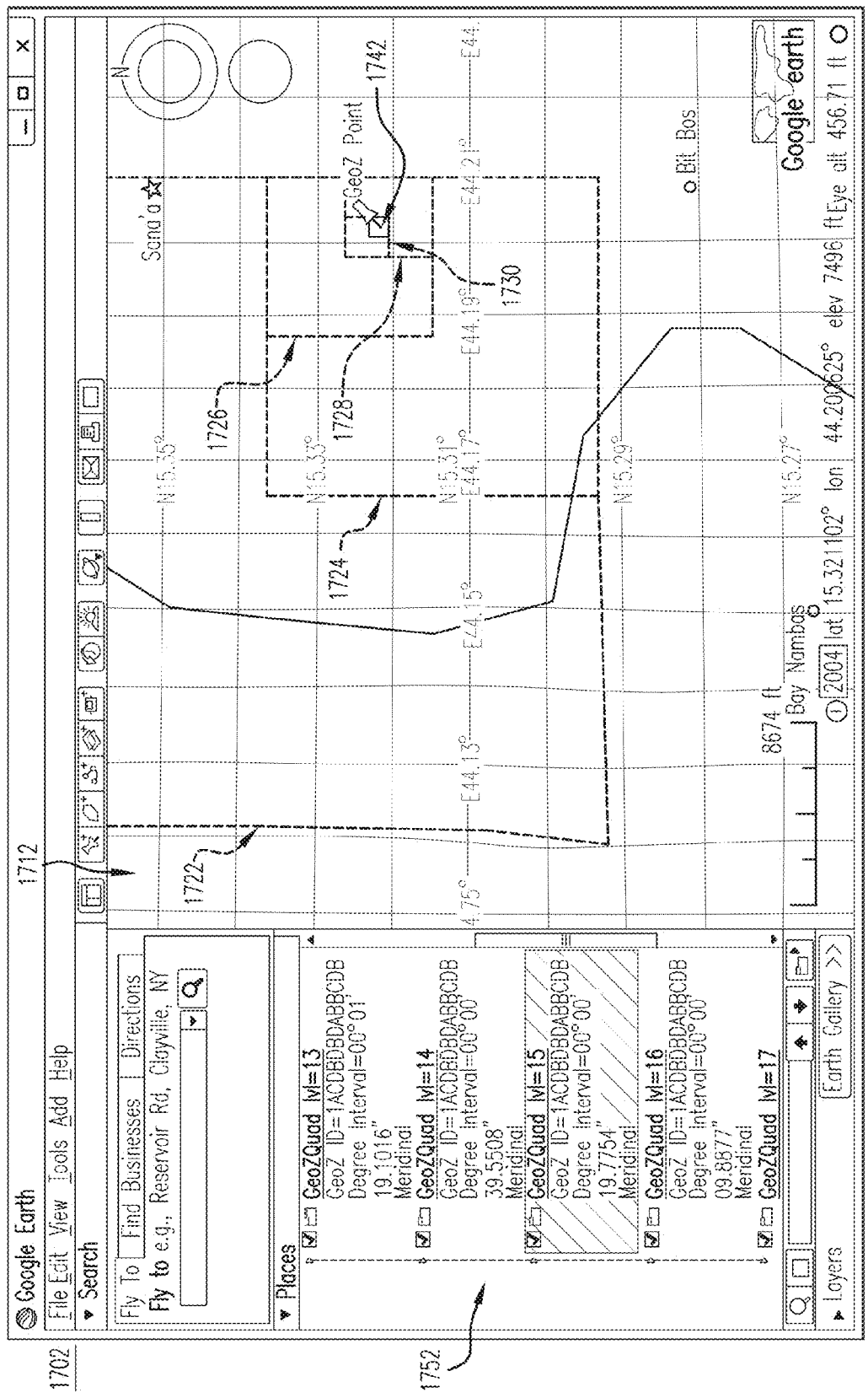
FIG. 17 is a screenshot showing a city scale view that includes contextual square quadrangles, where differing contexts are illustrated using different colors (shown as different dash-bordered quadrangles in FIG. 17) and transparency values, according to one embodiment of the present invention.

FIG. 17 shows window 1702 on a visual display device of a computer implementing one embodiment of a method according to the present invention. Window 1702 shows a city view 1712 that includes contextual square quadrangles 1722, 1724, 1726, 1728 and 1730 according to one embodiment of the present invention. Contextual square quadrangles 1722, 1724, 1726, 1728 and 1730 are a nested set of contextual square quadrangles. Also shown in window 1702 is a contextual geohash point 1742 that is indicated by a thumbtack icon. A hierarchical selection menu 1752 shows the levels and contextual geohash code IDs of quadrangles displayed in window 1702, i.e., contextual square quadrangles 1722, 1724, 1726, 1728 and 1730. Hierarchical selection menu 1752 allows a user to select that contextual geohash point 1442 be displayed.

Example 7

Figure 18:
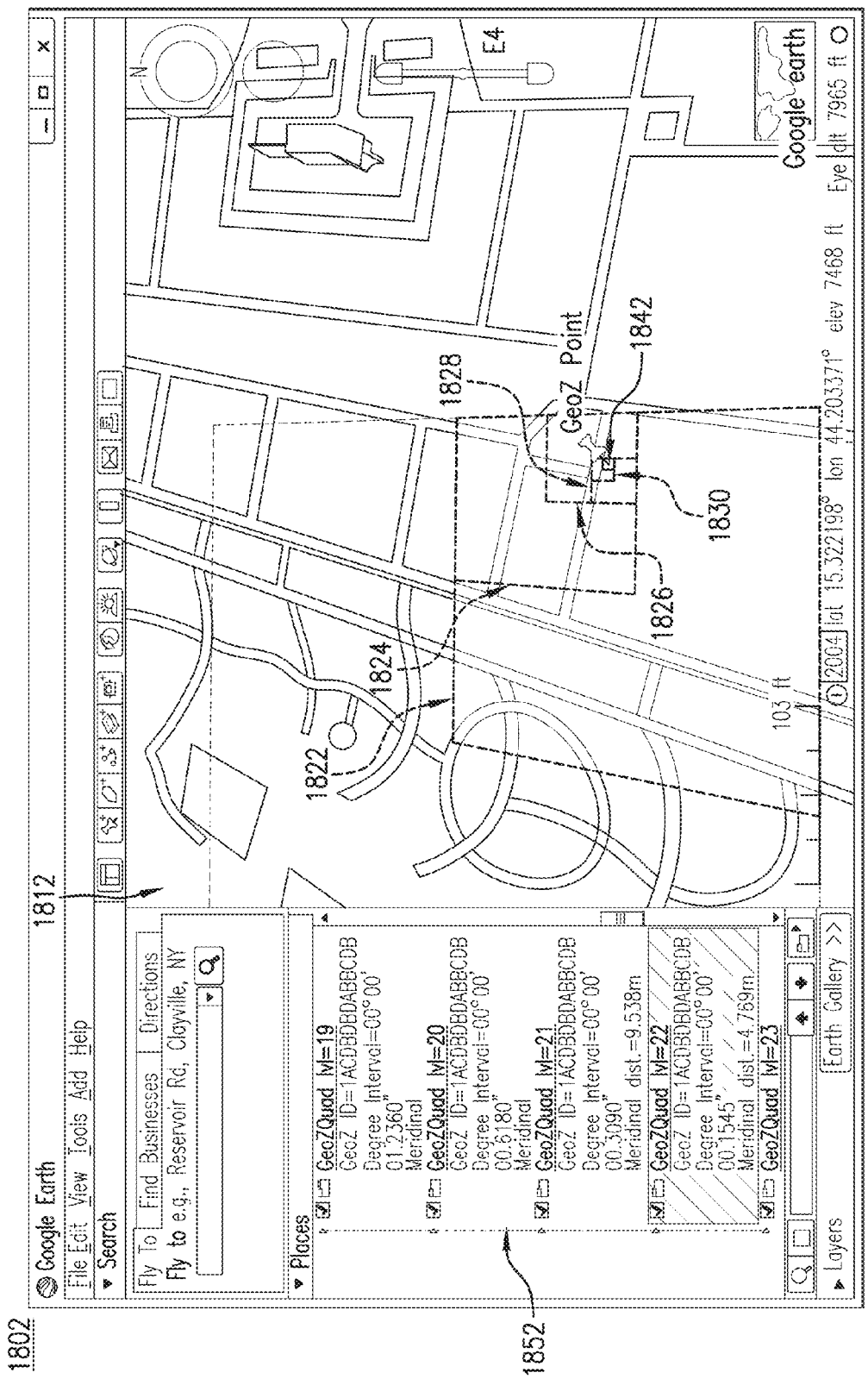
FIG. 18 is a screenshot showing a 5 m conflation scale view of contextual square quadrangles, where differing contexts are illustrated using different colors (shown as different dash-bordered quadrangles in FIG. 18) and transparency values, according to one embodiment of the present invention.

FIG. 18 shows window 1802 on a visual display device of a computer implementing one embodiment of a method according to the present invention. Window 1802 shows a 5 m conflation scale view 1812 of contextual square quadrangles 1822, 1824, 1826, 1828 and 1830 according to one embodiment of the present invention. Contextual square quadrangles 1822, 1824, 1826, 1828 and 1830 are a nested set of contextual square quadrangles. Also shown in window 1802 is a contextual geohash point 1842 that is indicated by a thumbtack icon that is located in contextual square quadrangle 1830. A hierarchical selection menu 1852 shows the levels and contextual geohash code IDs of quadrangles displayed in window 1802, i.e., contextual square quadrangles 1822, 1824, 1826, 1828 and 1830. Hierarchical selection menu 1852 allows a user to select that contextual geohash point 1842 be displayed.

Example 8

Figure 19:
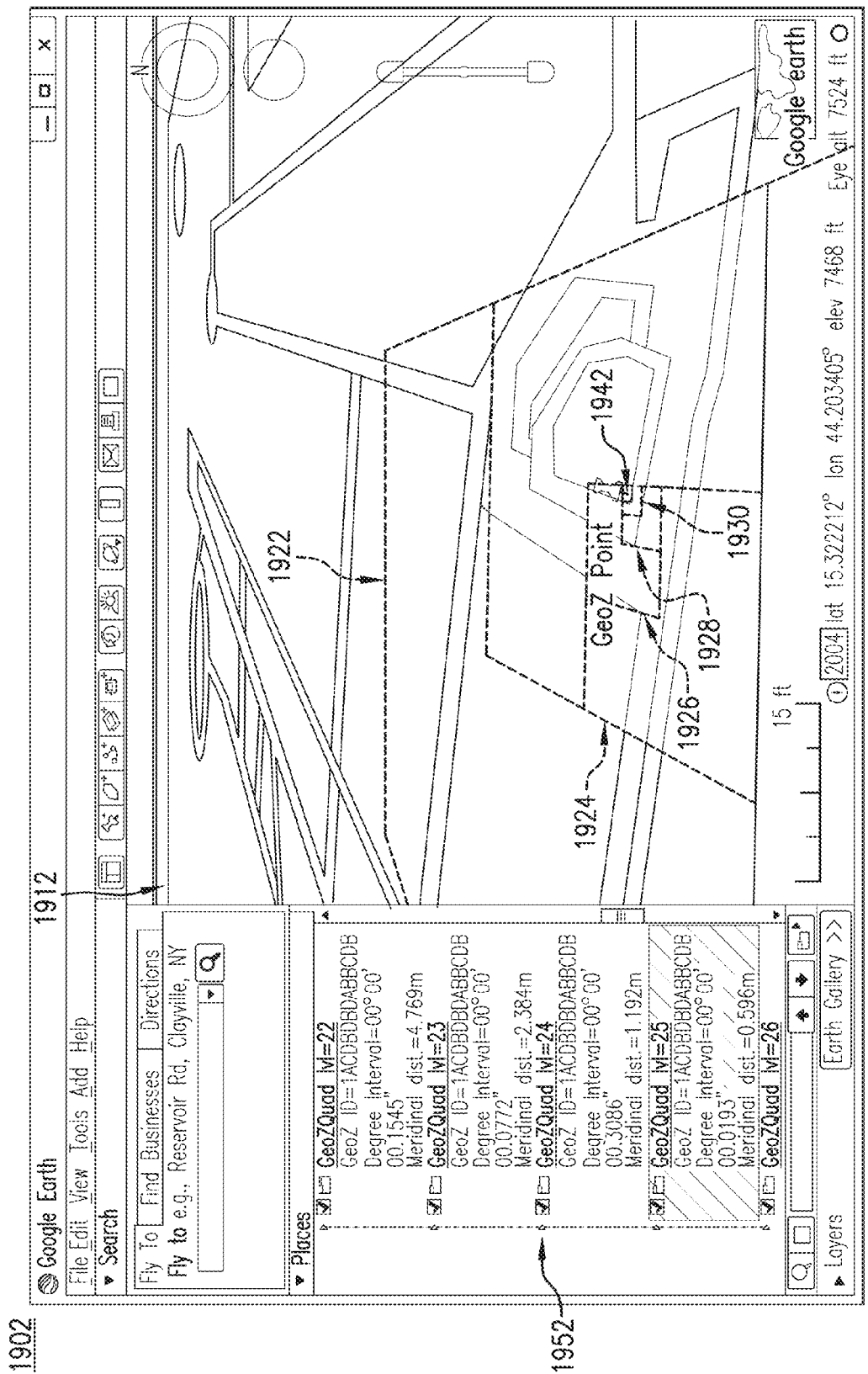
FIG. 19 is a screenshot showing a 0.6 m conflation scale view of contextual square quadrangles, where differing contexts are illustrated using different colors (shown as different dash-bordered quadrangles in FIG. 19) and transparency values, according to one embodiment of the present invention.

FIG. 19 shows window 1902 on a visual display device of a computer implementing one embodiment of a method according to the present invention. Window 1902 shows a 0.6 m conflation scale view 1912 of contextual square quadrangles 1922, 1924, 1926, 1928 and 1930 according to one embodiment of the present invention. Also shown in window 1902 is a contextual geohash point 1942 that is indicated by a thumbtack icon. A hierarchical selection menu 1952 shows the levels and contextual geohash code IDs of quadrangles displayed in window 1902, i.e., contextual square quadrangles 1922, 1924, 1926, 1928 and 1930. Hierarchical selection menu 1952 allows a user to select that contextual geohash point 1942 be displayed.

Example 9

Figure 20:
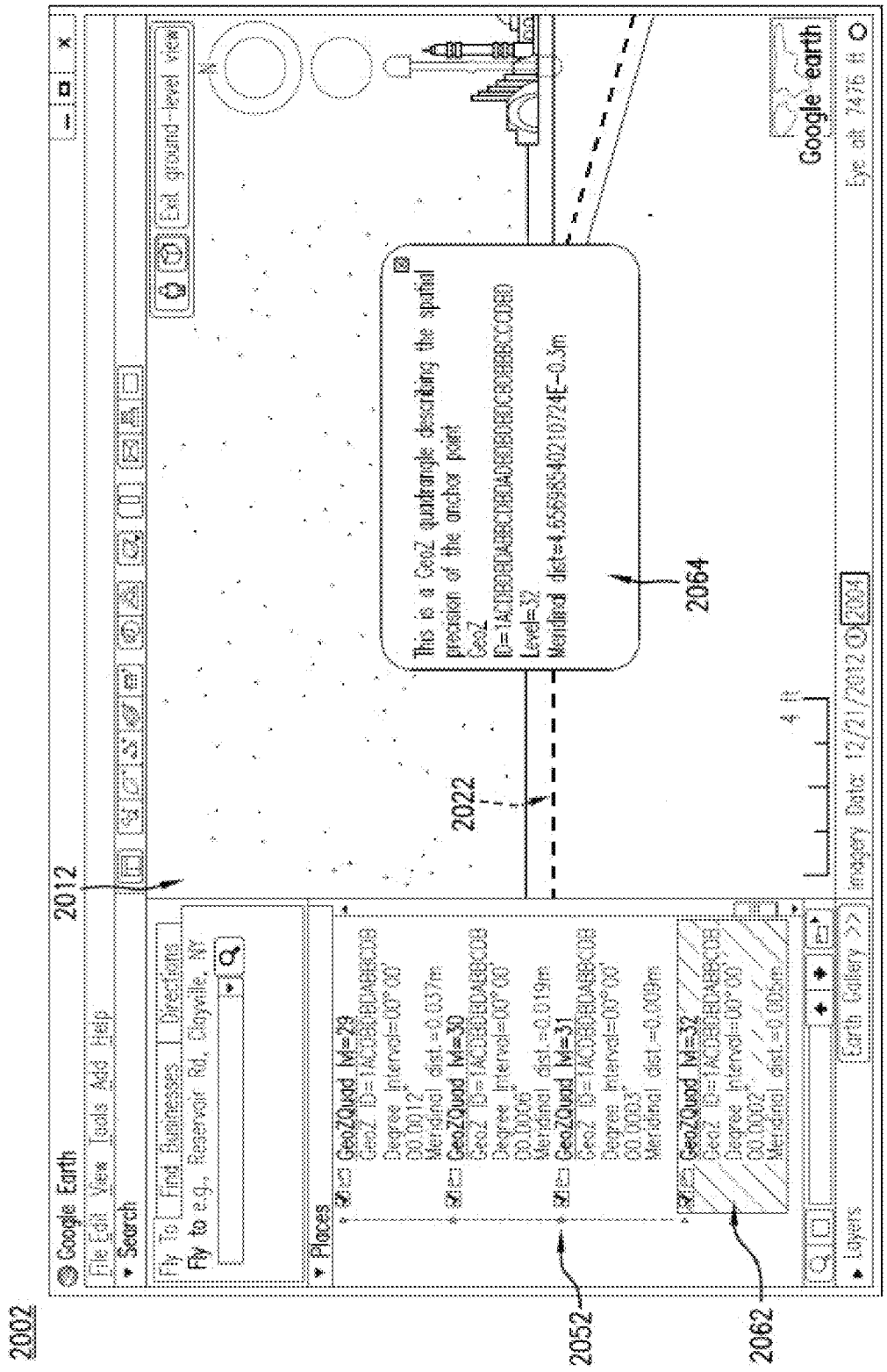
FIG. 20 is a screenshot showing a 5 mm conflation scale view of a contextual square quadrangle.

FIG. 20 shows window 2002 on a visual display device of a computer implementing one embodiment of a method according to the present invention. Window 2002 shows a 5 mm conflation scale view 2012 of a contextual square quadrangle 2022 according to one embodiment of the present invention. Hierarchical selection menu 2052 allows a user to select that contextual geohash point be displayed. In FIG. 20 a user has selected information 2062 for contextual square quadrangle 2022 on hierarchical selection menu 2052, thereby causing information pop-up 2064 to appear providing a contextual geohash code ID for contextual square quadrangle, level and meridional distance for the square quadrangle.

Example 10

Confidence Example

Confidence provides a means of characterizing ambiguity associated with the delineation of a place. This ambiguity may arise from scalar differences in the use of data, inaccuracies associated with the delineation or measurement of data, and/or differences in perspective drawn from a group of individuals about where a place exists.

Example 11

Boundary Examples

In one embodiment of the present invention, boundaries are described by the outside edge of a set of contextual geohash codes included in a boundary set. The boundary set may be further described by confidence subsets, which characterize the likelihood that the subregion is included in the boundary as defined by a source or perspective. For example, in the United States, a major metropolitan area is generally described by an urban center surrounded by suburbs. Exactly which suburbs are included may change by perspective and may evolve over time as a metropolitan area grows or declines.

Various types of geospatial boundaries can be described using the contextual geohash code of the present inveniton, including boundaries such as points, lines, polygons, complex polygons (including holes and/or distint collections of non-continguos polygons), as well as volumes extending both above and/or below the surface of the Earth or other reference body.

Figure 21:
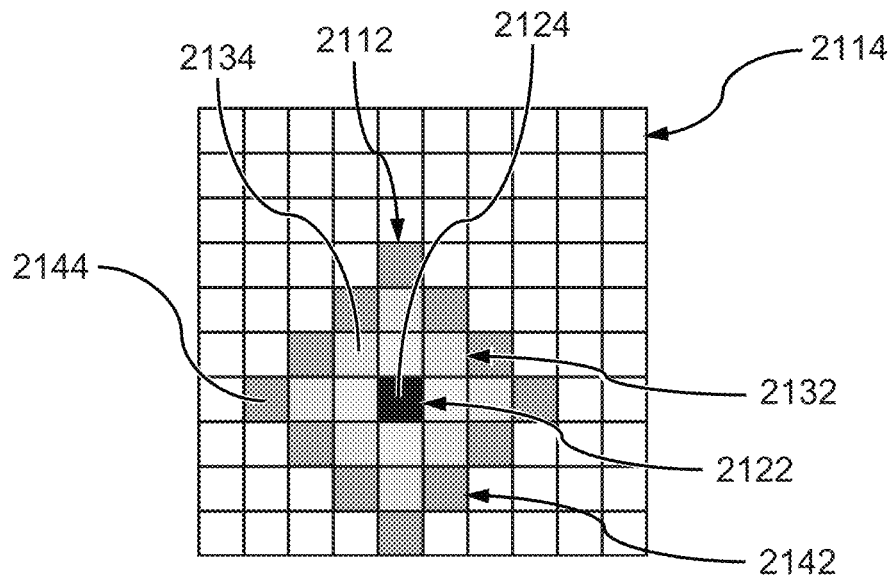
FIG. 21 is an illustration of a point geohash set with confidence sets indicated by different shades.

FIG. 21 shows a point geohash set 2112 in grid 2114 in which each confidence set has a different fill pattern. Each confidence set shown in FIG. 21 is defined by a confidence value. Confidence set 2122 is a 100% confidence set, i.e., the confidence value for the single contextual square quadrangle 2124 (black) in confidence set 2122 is 100% and corresponds to a geospatial point. Surrounding confidence set 2122 is a confidence set 2132 of contextual square quadrangles 2134 (light gray). Confidence set 2132 is a 95% confidence set, i.e., contextual square quadrangles 2134 each have a confidence value of at least 95%. Surrounding confidence set 2132 is a confidence set 2142 of contextual square quadrangles 2144 (medium gray). Confidence set 2142 is a 90% confidence set, i.e., contextual square quadrangles 2144 each have a confidence value of at least 90%. In this example, the point is described with the same level of precision (cell size) where the real world feature being described is 90+% likely to occur within relevant geolocations, i.e. the combination of confidence set 2122, confidence set 2132 and confidence set 2142. The 100% confidence set may be referred to as the real world feature itself. In this example, confidence set 2122 may be referred to as a geospatial point feature. Color values, transparancy values, statistical model results or other attributes may be used to convey the confience values as well.

Figure 22:
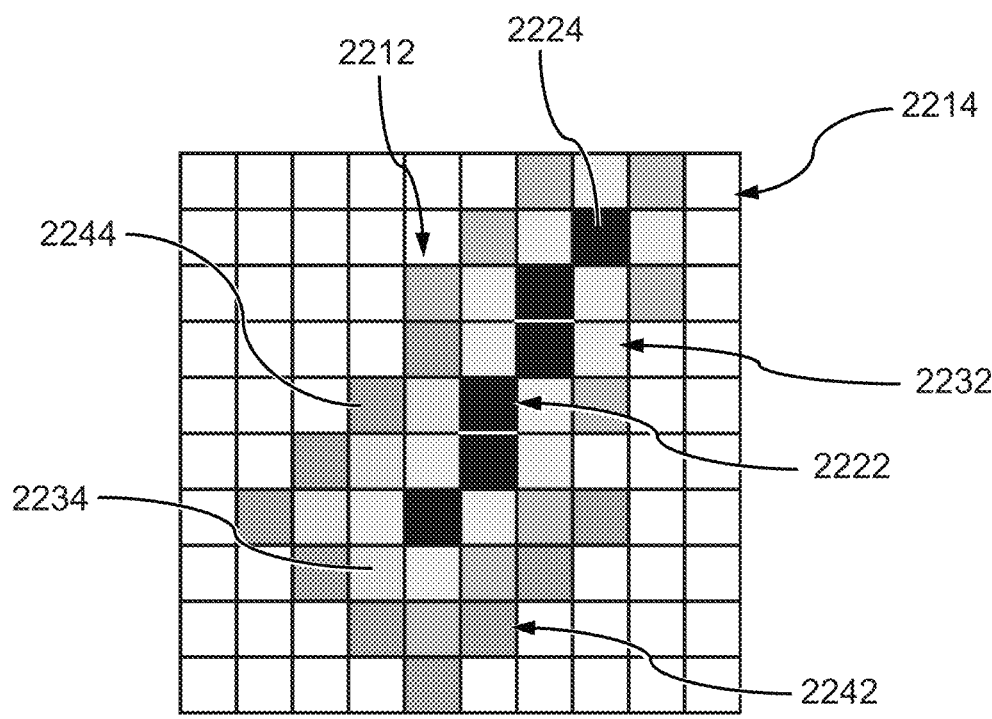
FIG. 22 is an illustration of a line segment geohash set with confidence sets indicated by different shades.

FIG. 22 shows a line segment geohash set 2212 in a grid 2214 which each confidence set has a different fill pattern. Each confidence set shown in FIG. 22 is defined by a confidence value. Confidence set 2222 is a 100% confidence set, i.e., the confidence value for each contextual square quadrangle 2224 (black) in confidence set 2222 is 100% and corresponds to a geospatial linear feature 2226. Surrounding confidence set 2222 is a confidence set 2232 of contextual square quadrangles 2234 (light gray). Confidence set 2232 is a 95% confidence set, i.e., contextual square quadrangles 2234 each have a confidence value of at least 95%. Surrounding confidence set 2232 is a confidence set 2242 of contextual square quadrangles 2244 (medium gray). Confidence set 2242 is a 90% confidence set, i.e., contextual square quadrangles 2244 each have a confidence value of at least 90%. In this example, geospatial linear feature 2226 is described with the same level of precision (cell size) where the real world feature being described is 90+% likely to occur within the relevant geolocations, i.e. the combination of confidence set 2222, confidence set 2232 and confidence set 2242. The 100% confidence set may be referred to as the real world feature itself. In this example, confidence set 2222 may be referred to as a geospatial linear feature. This example could also be described with a lower level of precision, which would represent the feature with a width of multiple quadrangles.

Figure 23:
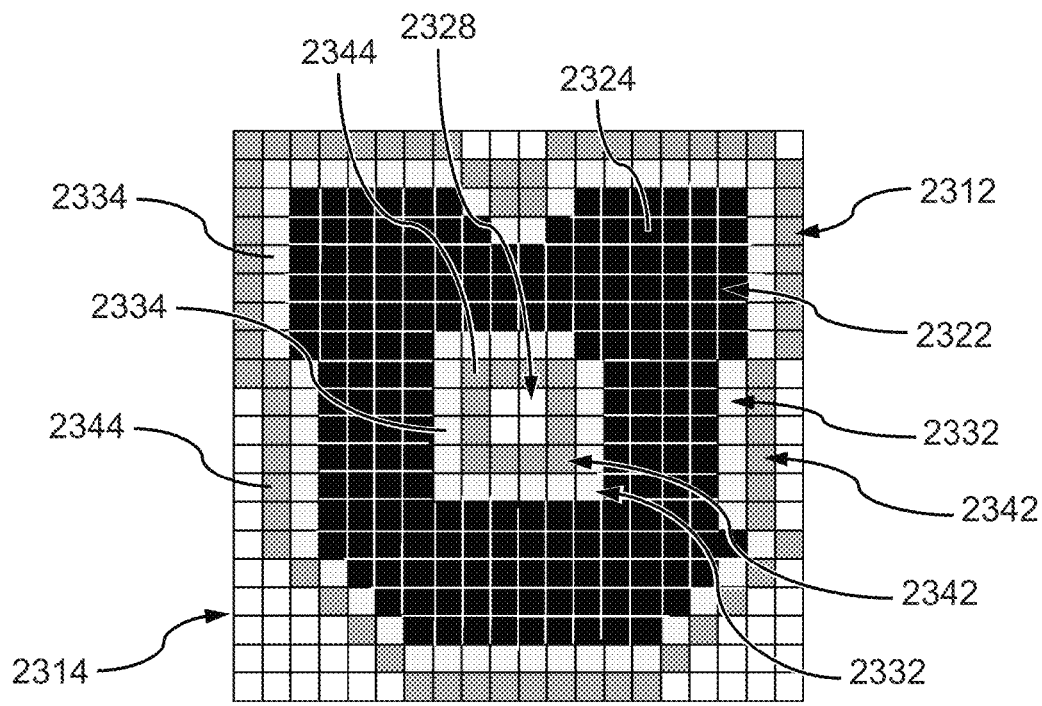
FIG. 23 is an illustration of a complex geohash set with confidence sets indicated by different shades.

FIG. 23 shows a complex polygon geohash set set 2312 in a grid 2314 in which each confidence set has a different fill pattern. Each confidence set shown in FIG. 23 is defined by a confidence value. Confidence set 2322 is a 100% confidence set, i.e., the confidence value for each contextual square quadrangle 2324 (black) in confidence set 2322 is 100% and corresponds to a geospatial complex polygon feature 2326 that includes a hole 2328. Surrounding confidence set 2322 is a confidence set 2332 of contextual square quadrangles 2334 (light gray). Confidence set 2332 is a 95% confidence set, i.e., contextual square quadrangles 2334 each have a confidence value of at least 95%. Surrounding confidence set 2332 is a confidence set 2342 of contextual square quadrangles 2344 (medium gray). Confidence set 2342 is a 90% confidence set, i.e., contextual square quadrangles 2344 each have a confidence value of at least 90%. In this example, geospatial complex polygon feature 2326 is described with the same level of precision (cell size) where the real world feature being described is 90+% likely to occur within the relevant geolocations, i.e. the combination of confidence set 2322, confidence set 2332 and confidence set 2342. The 100% confidence set may be referred to as the real world feature itself. In this example, confidence set 2222 may be referred to as a geospatial linear feature.

Figure 24:
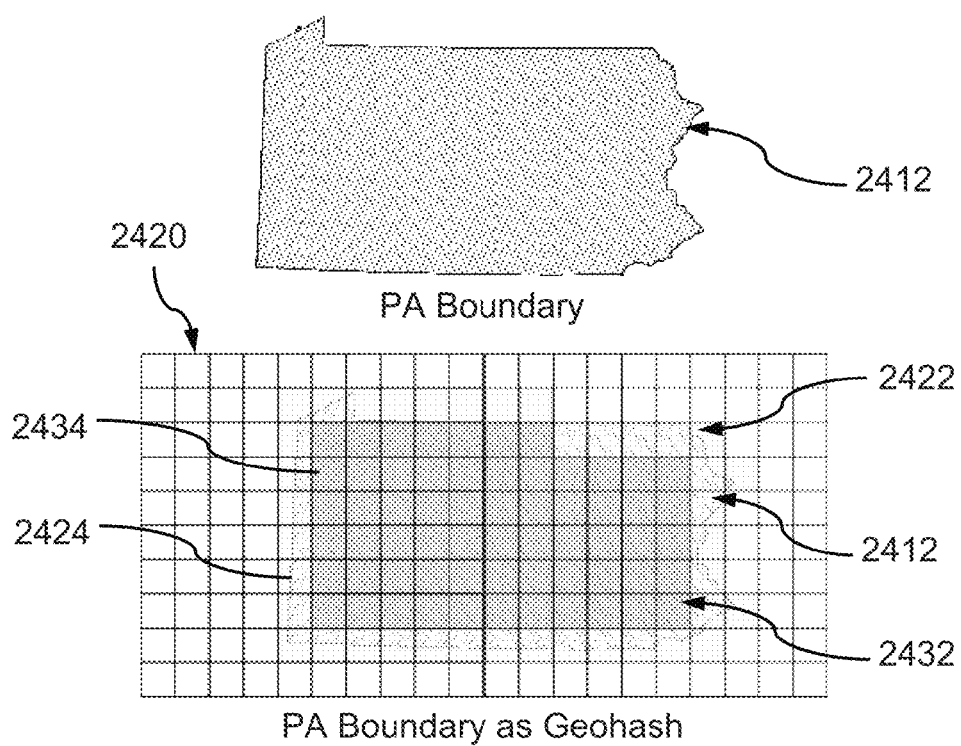
FIG. 24 is an illustration of a state boundary and the state boundary as a geohash set with confidence sets indicated by different shades.

FIG. 24 illustrates how geohash set can be used to describe a political boundary, i.e. state boundary 2412 which is the state boundary for for the state of Pennsylvania. Shown in grid 2420 is a boundary geohash set 2422 consisting of contextual square quadrangles 2424 (light gray) that include state boundary 2412 and that each have a confidence value of 100% with respect to including state boundary 2412. Also shown in grid 2420 is an interior geohash set 2432 (medium gray) consisting of contextual square quadrangles 2434 that each have a confidence value of less than 100% with respect to including state boundary 2412.

Although one precision level is shown in FIG. 24, any precision level may be used to describe a boundary, such as the state boundary shown in FIG. 24. For example, for any precision level, contextual square quadrangles that are known to includes the state boundary are coded with a 100% confidence value and each interior contextual square quadrangle are coded with the appropriate confidence level. A first confidence set can be formed from the contextual square quadrangles that have a 100% confidence value. A a second confidence set can then be formed of interior contextual square confidence quadrangles that each have at confidence value of at least a particular threshold confidence value, such as at least 95%. The state boundary can then be defined as a geohash set including the first and second confidence sets.

Example 12

Search Example

Because geohash code IDs are globally unique, code matching schemes can be efficiently employed to compare a corpus of data described with geohash IDs with a set of search IDs. If any corpus ID matches any search ID then the corresponding data describe a common place or an aspect of a place depending upon the confidence associated with the match IDs.

Example 13

Contextual Temporal Hashing Example

Contextual temporal hashing characterizes the temporal extent (occurrence and duration) and potential periodicity of an event. Similar to geohash codes, temporal hash codes may include confidence, which is used to character temporal ambiguity associated with an event from a defined perspective. For instance, a temporal hash code might be defined as Monday, 19 May 2014 as a standard business day, which has the definition of a non-holiday or weekend day from 9 AM local to 5 PM local. This temporal hash code include a confidence value of 12 PM-1 PM as a likely non-working lunch hour.

Example 14

Contextual Elevation Hashing Example

Because geohash code IDs are explicity defined as a volume from the center of the Earth extending out to intercept the cestial sphere at a specified time, these volumes can be segregated into various subvolumes. When a subvolume is bounded by the surface of the Earth within a defined range of height above a datum, such as mean sea level, then the hashing scheme describes elevation hashing. Biomes or physiographic regions that are associated with specific elevation ranges can be hashed this way. Another example is elevation hashing of data by the contour ranges defined by topographic maps.

Example 15

Contextual Motion Hashing Example

Contextual motion hashing can describe the motion of objects relative to the Earth, such as a car traveling down a road or a thunder storm moving across a region.

Example 16

Contextual Celestial Hashing Example

Celestial hashing describes the orbit and/or rotation of the Earth with respect to another celestial body, such as the sun, moon, stars, or other planets. The likely occurrence of sunlight, twilight, night or moonlight at a defined location and time is the aspect that is hashed.

All documents, patents, journal articles and other materials cited in the present application are incorporated herein by reference.

While the present invention has been disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method comprising the following steps:
   (a) constructing a boundary for a geospatial feature or entity comprising a set of contextual square quadrangles, and
   (b) displaying to a user the boundary on a visual display device and/or saving the boundary to a storage medium,
   wherein each quadrangle of the set of quadrangles has a confidence value,
   wherein each contextual square quadrangle of the set of contextual square quadrangles has a contextual geohash code ID,
   wherein each contextual geohash code ID has a length, and
   wherein each contextual square quadrangle of the set of contextual square quadrangles has a precision value based on the length of a contextual geohash code ID for the contextual square quadrangle.

2. The method of claim 1, wherein a first quadrangle of the set of contextual square quadrangles has a first precision value, wherein a second contextual square quadrangle of the set of contextual square quadrangles has a second precision value, and wherein the first precision value is different than the second precision value.

3. The method of claim 1, wherein the boundary is on the surface of the earth.

4. The method of claim 1, wherein the boundary is below the surface of the earth.

5. The method of claim 1, wherein the boundary is above the surface of the earth.

6. The method of claim 1, wherein the boundary extends to intersect with the celestial sphere.

7. The method of claim 1, wherein step (b) comprises displaying the boundary to the user on a visual display device.

8. The method of claim 1, wherein step (b) comprises saving the boundary to a storage medium.

9. An apparatus comprising:
one or more processors, and
a machine-readable medium for storing instructions thereon which when executed by the one or more processors cause the one or more processors to perform operations comprising the following steps:
(a) constructing a boundary for a geospatial feature or entity comprising a set of contextual square quadrangles, and
(b) displaying to a user the boundary on a visual display device and saving the boundary to a storage medium,
wherein each quadrangle of the set of quadrangles has a confidence value,
wherein each contextual square quadrangle of the set of contextual square quadrangles has a contextual geohash code ID,
wherein each contextual geohash code ID has a length, and
wherein each contextual square quadrangle of the set of contextual square quadrangles has a precision value based on the length of a contextual geohash code ID for the contextual square quadrangle.

10. The apparatus of claim 9, wherein a first quadrangle of the set of contextual square quadrangles has a first precision value, wherein a second contextual square quadrangle of the set of contextual square quadrangles has a second precision value, and wherein the first precision value is different than the second precision value.

11. The apparatus of claim 9, wherein the boundary is on the surface of the earth.

12. The apparatus of claim 9, wherein the boundary is below the surface of the earth.

13. The apparatus of claim 9, wherein the boundary is above the surface of the earth.

14. The apparatus of claim 9, wherein the boundary extends to intersect with the celestial sphere.

15. The apparatus of claim 9, wherein step (b) comprises displaying the boundary to the user on a visual display device.

16. The apparatus of claim 9, wherein step (b) comprises saving the boundary to a storage medium.

17. A method comprising the following steps:
(a) searching a set of contextual square quadrangles defining a geospatial feature or entity for one or more desired contextual square quadrangles meeting a set of search criteria, and
(b) displaying to a user at least one desired contextual square quadrangle of the one or more desired contextual square quadrangles on a visual display device and saving the at least one desired contextual square quadrangles to a storage medium,
wherein each quadrangle of the set of quadrangles has a confidence value, wherein each contextual square quadrangle of the set of contextual square quadrangles has a contextual geohash code ID,
wherein each contextual geohash code ID has a length, and
wherein each contextual square quadrangle of the set of contextual square quadrangles has a precision value based on the length of a contextual geohash code ID for the contextual square quadrangle.

18. The method of claim 17, wherein a first quadrangle of the set of contextual square quadrangles has a first precision value, wherein a second contextual square quadrangle of the set of contextual square quadrangles has a second precision value, and wherein the first precision value is different than the second precision value.

19. The method of claim 17, wherein step (b) comprises displaying an image of the at least one square quadrangle on the visual display device and/or saving an image of the at least one square quadrangle to a storage medium.

20. The method of claim 17, wherein step (b) comprises displaying a contextual geohash code ID of the at least one square quadrangle on the visual display device and/or a contextual geohash code ID of the at least one square quadrangle to a storage medium.

21. The method of claim 17, wherein the at least one desired contextual square quadrangle is on the surface of the earth.

22. The method of claim 17, wherein the at least one desired contextual square quadrangle is below the surface of the earth.

23. The method of claim 17, wherein the at least one desired contextual square quadrangle is above the surface of the earth.

24. The method of claim 17, wherein the at least one desired contextual square quadrangle extends to intersect with the celestial sphere.

25. The method of claim 17, wherein step (b) comprises displaying the at least one desired contextual square quadrangle to the user on a visual display device.

26. The method of claim 17, wherein step (b) comprises saving the at least one desired contextual square quadrangle to a storage medium.

27. An apparatus comprising:
one or more processors, and
a machine-readable medium for storing instructions thereon which when executed by the one or more processors cause the one or more processors to perform operations comprising the following steps:
(a) searching a set of contextual square quadrangles defining a geospatial feature or entity for one or more desired contextual square quadrangles meeting a set of search criteria, and
(b) displaying to a user at least one desired contextual square quadrangle of the one or more desired contextual square quadrangles on a visual display device and saving the at least one desired contextual square quadrangles to a storage medium, wherein each quadrangle of the set of quadrangles has a confidence value, wherein each contextual square quadrangle of the set of contextual square quadrangles has a contextual geohash code ID,
where each contextual geohash code ID has a length, and
wherein each contextual square quadrangle of the set of contextual square quadrangles has a precision value based on the length of a contextual geohash code ID for the contextual square quadrangle.

28. The apparatus of claim 27, wherein a first quadrangle of the set of contextual square quadrangles has a first precision value, wherein a second contextual square quadrangle of the set of contextual square quadrangles has a second precision value, and wherein the first precision value is different than the second precision value.

29. The apparatus of claim 27, wherein step (b) comprises displaying an image of the at least one square quadrangle on the visual display device and/or saving an image of the at least one square quadrangle to a storage medium.

30. The apparatus of claim 27, wherein step (b) comprises displaying a contextual geohash code ID of the at least one square quadrangle on the visual display device and/or a contextual geohash code ID of the at least one square quadrangle to a storage medium.

31. The apparatus of claim 27, wherein the at least one desired contextual square quadrangle is on the surface of the earth.

32. The apparatus of claim 27, wherein the at least one desired contextual square quadrangle is below the surface of the earth.

33. The apparatus of claim 27, wherein the at least one desired contextual square quadrangle is above the surface of the earth.

34. The apparatus of claim 27, wherein the at least one desired contextual square quadrangle extends to intersect with the celestial sphere.

35. The apparatus of claim 27, wherein step (b) comprises displaying the at least one desired contextual square quadrangle to the user on a visual display device.

36. The apparatus of claim 27, wherein step (b) comprises saving the at least one desired contextual square quadrangle to a storage medium.

* * * * *